(12) United States Patent
Jung et al.

(10) Patent No.: US 12,336,046 B2
(45) Date of Patent: Jun. 17, 2025

(54) GROUP-BASED CONNECTION RELEASE

(71) Applicant: Lenovo (Singapore) Pte. Limited, Singapore (SG)

(72) Inventors: Hyejung Jung, Northbrook, IL (US); Joachim Löhr, Wiesbaden (DE); Hyung-Nam Choi, Ottobrunn (DE); Vijay Nangia, Woodridge, IL (US); Sher Ali Cheema, Ilmenau (DE); Majid Ghanbarinejad, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 651 days.

(21) Appl. No.: 17/560,076

(22) Filed: Dec. 22, 2021

(65) Prior Publication Data

US 2023/0199911 A1 Jun. 22, 2023

(51) Int. Cl.
*H04W 76/30* (2018.01)
*H04W 8/18* (2009.01)
(Continued)

(52) U.S. Cl.
CPC ........... *H04W 76/30* (2018.02); *H04W 8/186* (2013.01); *H04W 76/19* (2018.02); *H04W 76/27* (2018.02)

(58) Field of Classification Search
CPC ..... H04W 76/30; H04W 8/186; H04W 76/19; H04W 76/27; H04W 68/00; H04W 76/40; H04B 7/18563
See application file for complete search history.

(56) References Cited

U.S. PATENT DOCUMENTS

2012/0302240 A1* 11/2012 Tamaki ............... H04W 72/121
455/436
2021/0045093 A1* 2/2021 Rao ........................ H04W 76/14
(Continued)

OTHER PUBLICATIONS

"Medium Access Control (MAC) protocol specification", 3rd Generation Partnership Project; Technical Specification Group Radio Access Network, 3GPP TS 38.321 V16.6.0, 3GPP Organizational Partners, Valbonne, France [retrieved Feb. 2, 2022]. Retrieved from the Internet <http://www.3gpp.org>., Sep. 2021, 158 Pages.
(Continued)

*Primary Examiner* — Justin T Van Roie
(74) *Attorney, Agent, or Firm* — FIG. 1 Patents

(57) ABSTRACT

Various aspects of the present disclosure relate to a UE that receives a group RRC release message that is based on a group mobility configuration, the group RRC release message intended for communication to a group of multiple UEs. The UE can switch to a RRC inactive state based in part on a determination that a RRC connection suspend configuration directed to the UE is included in the group RRC release message. The UE can switch to a RRC idle state based in part on a determination that the RRC connection suspend configuration is not included in the group RRC release message. A network entity can generate the group RRC release message with the group mobility configuration, and the group RRC release message is intended for communication to the group of multiple UEs. The network entity can then transmit the group RRC release message to the group of multiple UEs.

20 Claims, 9 Drawing Sheets

(51) Int. Cl.
*H04W 76/19* (2018.01)
*H04W 76/27* (2018.01)

(56) References Cited

U.S. PATENT DOCUMENTS

2021/0067994 A1    3/2021  Chen
2024/0357631 A1*  10/2024  Watts .................. H04W 72/543

OTHER PUBLICATIONS

"Non-Access-Stratum (NAS) protocol for 5G System (5GS): Stage 3", 3rd Generation Partnership Project, Technical Specification Group Core Network and Terminals, 3GPP TS 24.501 V17.4.1, 3GPP Organizational Partners, Valbonne, France [retrieved Feb. 2, 2022]. Retrieved from the Internet <http://www.3gpp.org>., Sep. 2021, 863 pages.

"Procedures for the 5G System (5GS)", 3rd Generation Partnership Project, Technical Specification Group Services and System Aspects, 3GPP TS 23.502 V17.2.1, 3GPP Organizational Partners, Valbonne, France [retrieved Feb. 2, 2022]. Retrieved from the Internet <http://www.3gpp.org>., Sep. 2021, 712 pages.

"Radio Resource Control (RRC) protocol specification", 3rd Generation Partnership Project; Technical Specification Group Radio Access Network, 3GPP TS 38.331 V16.6.0, 3GPP Organizational Partners, Valbonne, France [retrieved Feb. 2, 2022]. Retrieved from the Internet <http://www.3gpp.org>., Sep. 2021, 961 Pages.

"Service requirements for the 5G system: Stage 1", 3rd Generation Partnership Project, Technical Specification Group Services and System Aspects, 3GPP TS 22.261 V18.4.0, 3GPP Organizational Partners, Valbonne, France [retrieved Feb. 2, 2022]. Retrieved from the Internet <http://www.3gpp.org>., Sep. 2021, 107 pages.

"User Equipment (UE) procedures in Idle mode and RRC Inactive state (Release 16)", 3rd Generation Partnership Project, Technical Specification Group Radio Access Network, 3GPP TS 38.304 V16.6.0, 3GPP Organizational Partners, Valbonne, France [retrieved Feb. 2, 2022]. Retrieved from the Internet <http://www.3gpp.org>., Sep. 2021, 39 pages.

3GPP , "3rd Generation Partnership Project; Technical Specification Group Radio Access Network; NR; Radio Resource Control (RRC) protocol specification (Release 16)", 3GPP TS 38.331, V16.7.0 [retrieved Mar. 22, 2023]. Retrieved from the Internet <http://www.3gpp.org> Document 1 of 3, Dec. 2021, 963 pages.

3GPP , "3rd Generation Partnership Project; Technical Specification Group Radio Access Network; NR; Radio Resource Control (RRC) protocol specification (Release 16)", 3GPP TS 38.331, V16.7.0 [retrieved Mar. 22, 2023]. Retrieved from the Internet <http://www.3gpp.org> Document 2 of 3, Dec. 2021, 963 pages.

3GPP , "3rd Generation Partnership Project; Technical Specification Group Radio Access Network; NR; Radio Resource Control (RRC) protocol specification (Release 16)", 3GPP TS 38.331, V16.7.0 [retrieved Mar. 22, 2023]. Retrieved from the Internet <http://www.3gpp.org> Document 3 of 3, Dec. 2021, 963 pages.

3GPP , "3rd Generation Partnership Project; Technical Specification Group Radio Access Network; NR—User Equipment (UE) procedures in Idle mode and RRC 56 Inactive state (Release 16)", 3GPP TS 38.304 V16.7.0 [retrieved Mar. 22, 2023]. Retrieved from the Internet <http://3gpp.org>, Dec. 2021, 39 pages.

PCT/IB2022/062243 , "International Search Report and Written Opinion", PCT Application No. PCT/IB2022/062243, Mar. 17, 2023, 14 pages.

* cited by examiner

```
-- ASN1START
-- TAG-GROUPRRCRELEASE-START

GroupRRCRelease ::=                    SEQUENCE {
    rrc-TransactionIdentifier          RRC-TransactionIdentifier,
    criticalExtensions                 CHOICE {
        groupRRCRelease                    GroupRRCRelease-IEs,
        criticalExtensionsFuture           SEQUENCE {}
                                                        404
    }
}

GroupRRCRelease-IEs ::=                SEQUENCE {
    redirectedCarrierInfoList          SEQUENCE (SIZE (1..maxNrofSubGroupsPerGroup)) OF
RedirectedCarrierInfo-r18              OPTIONAL,    -- Need N
                                                                                402
    cellReselectionPriorities          CellReselectionPriorities
OPTIONAL,    -- Need R
    suspendConfigurationSet ::=                    SEQUENCE {
        ran-PagingCycle                    PagingCycle,
        ran-NotificationAreaInfo           RAN-NotificationAreaInfo OPTIONAL,    -- Need M
        suspendConfigList   SEQUENCE (SIZE (1..maxNrofUEsPerGroup)) OF SuspendConfig-r18
    } OPTIONAL,    -- Need N
    deprioritisationReq                SEQUENCE {
        deprioritisationType               ENUMERATED {frequency, nr},
        deprioritisationTimer              ENUMERATED {min5, min10, min15, min30}
    }
OPTIONAL,    -- Need N
    lateNonCriticalExtension           OCTET STRING
OPTIONAL,
    nonCriticalExtension               RRCRelease-v1540-IEs
OPTIONAL,
}

RRCRelease-v1540-IEs ::=               SEQUENCE {
    waitTime                           RejectWaitTime             OPTIONAL,    -- Need N
    nonCriticalExtension               RRCRelease-v1610-IEs       OPTIONAL
}

RRCRelease-v1610-IEs ::=               SEQUENCE {
    measIdleConfig-r16                 SetupRelease {MeasIdleConfigDedicated-r16}   OPTIONAL, --
Need N           406
    nonCriticalExtension               SEQUENCE {}                OPTIONAL
}

RedirectedCarrierInfo-r18 ::=          SEQUENCE {
    ue-IdentityInGroup-Range           UE-IdentityInGroup-Range,
    CHOICE {
        nr                                 CarrierInfoNR-r18,
        eutra                              RedirectedCarrierInfo-EUTRA-r18,
    }
}

RedirectedCarrierInfo-EUTRA-r18 ::=    SEQUENCE {
    eutraFrequency                     ARFCN-ValueEUTRA,                  408
    cnType                             ENUMERATED {epc, fiveGC}
OPTIONAL,    -- Need N
    preferredCellList-EUTRA            PreferredCellList-EUTRA    OPTIONAL    -- Need N
}

CarrierInfoNR-r18 ::=                  SEQUENCE {
    carrierFreq                        ARFCN-ValueNR,
    sshSubcarrierSpacing               SubcarrierSpacing,         408
    smtc                               SSB-MTC,
OPTIONAL,    -- Need S
    preferredCellList-NR               PreferredCellList-NR       OPTIONAL    -- Need N
}

PreferredCellList-EUTRA ::= SEQUENCE (SIZE (1..8)) OF CellIdentity-EUTRA
PreferredCellList-NR    ::= SEQUENCE (SIZE (1..8)) OF CellIdentity
CellIdentity-EUTRA ::= BIT STRING (SIZE (28))
CellIdentity ::= BIT STRING (SIZE (36))
```

GROUP-BASED CONNECTION RELEASE

TECHNICAL FIELD

The present disclosure relates to wireless communications, and more specifically to a group-based connection release.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G.

In some cases, a wireless communications system may be a terrestrial network (TN), a non-terrestrial network (NTN), or combination thereof, which may support various communication devices for wireless communications. For example, an NTN may include network entities onboard non-terrestrial vehicles such as satellites, unmanned aerial vehicles (UAV), and high-altitude platforms systems (HAPS), as well as network entities on the ground, such as gateway entities capable of communications with one or multiple user equipment (UEs) connected to the NTN over a wireless medium. For a group of UEs connected with a serving cell, each UE is individually redirected, such as for handoff to a different serving cell. Offloading a large number of UEs connected with one serving cell to another may be time restrictive, for example, in an NTN with fast moving satellites, or with other non-terrestrial stations (NTSs) and/or transmit-receive points (TRPs).

SUMMARY

The present disclosure relates to methods, apparatuses, and systems that enable a group-based radio resource control (RRC) connection release procedure, which can be utilized to simultaneously redirect a group of multiple UEs to a different frequency layer. This facilitates offloading a large number of the UEs connected with one serving cell to a neighboring serving cell of another frequency layer, or of another radio access technology (RAT), in order to turn off a network node, such as to accommodate power saving and/or interference management. Switching multiple UEs in a serving cell simultaneously from an RRC connected state to an RRC inactive state may also facilitate performing feeder link switching in non-terrestrial network (NTN) and/or changing a serving cell for a mobile integrated access and backhaul (IAB)-node.

Aspects of this disclosure provide detailed signaling methods (e.g., procedures, techniques) enabling a group-based RRC connection release procedure. In aspects of the disclosure, a UE can receive a group RRC release message based on a configured group identity, where the group RRC release message may include multiple RRC connection suspend configurations and/or multiple redirected carrier configurations. The UE can determine to enter into an RRC inactive state, such as if the UE identifies a RRC connection suspend configuration intended or directed to the UE in the received group RRC release message. Otherwise, the UE can enter into an RRC idle state. The UE may further receive, in the RRC connection suspend configuration, information of a preferred serving cell and a scheduled time (e.g., UTC) or a scheduled time window during which the UE can send a RRC resume request message to the preferred cell for any access category. If the UE enters into the RRC idle state, then the UE can determine one or more redirected carrier configurations assigned to the UE among the multiple redirected carrier configurations.

Some implementations of the method and apparatuses described herein may further include group-based connection release at an apparatus (e.g., a UE), which includes a receiver to receive a group RRC release message that is based on a group mobility configuration, the group RRC release message intended for communication to a group of multiple UEs. The apparatus (e.g., a UE) implements a connection manager to switch to an RRC inactive state based in part on a determination that an RRC connection suspend configuration directed to the apparatus is included in the group RRC release message. The connection manager can switch to an RRC idle state based in part on a determination that the RRC connection suspend configuration is not included in the group RRC release message.

In some implementations of the method and apparatuses described herein, the group mobility configuration includes a group identity and an apparatus identity of the apparatus within the group of multiple UEs, and the group of multiple UEs are configured with the group identity. The connection manager can identify that the RRC connection suspend configuration includes an indication of the apparatus in order to determine that the RRC connection suspend configuration is directed to the apparatus. In an implementation, the group RRC release message may include multiple RRC connection suspend configurations for a subset of the UE in the group of multiple UEs, and the subset of UEs can be configured with a common configuration. In an implementation, the connection manager can perform a RRC connection resume procedure based in part on timing information received in the RRC connection suspend configuration directed to the apparatus. The connection manager may select a serving cell based in part on cell information received in the RRC connection suspend configuration directed to the apparatus, and perform a RRC connection resume procedure based in part on the selected serving cell. In another implementation, the group RRC release message includes multiple redirected carrier information configurations. Responsive to the determination that the RRC connection suspend configuration is not included in the group RRC release message, the connection manager can identify that at least one of the multiple redirected carrier information configurations is intended to the apparatus, and select a serving cell based on the at least one identified redirected carrier information configuration.

Some implementations of the method and apparatuses described herein may further include group-based connection release at an apparatus (e.g., a network entity), which includes a group manager to generate a group RRC release message with a group mobility configuration, the group RRC release message intended for communication to a group of multiple UEs. The apparatus also includes a transmitter to transmit the group RRC release message to the group of multiple UEs, where a first UE is initiated to switch to a RRC inactive state if a RRC connection suspend configuration included in the group RRC release message is directed to the first UE, and where a second UE is initiated to switch to a RRC idle state if another RRC connection suspend configuration directed to the second UE is not included in the group RRC release message.

BRIEF DESCRIPTION OF THE DRAWINGS

Various aspects of the present disclosure for group-based connection release are described with reference to the following Figures. The same numbers may be used throughout to reference like features and components shown in the Figures.

FIGS. 4 and 5 illustrate an example of a group RRC release message (GroupRRCRelease) that supports group-based connection release in accordance with aspects of the present disclosure.

DETAILED DESCRIPTION

Figure 1:
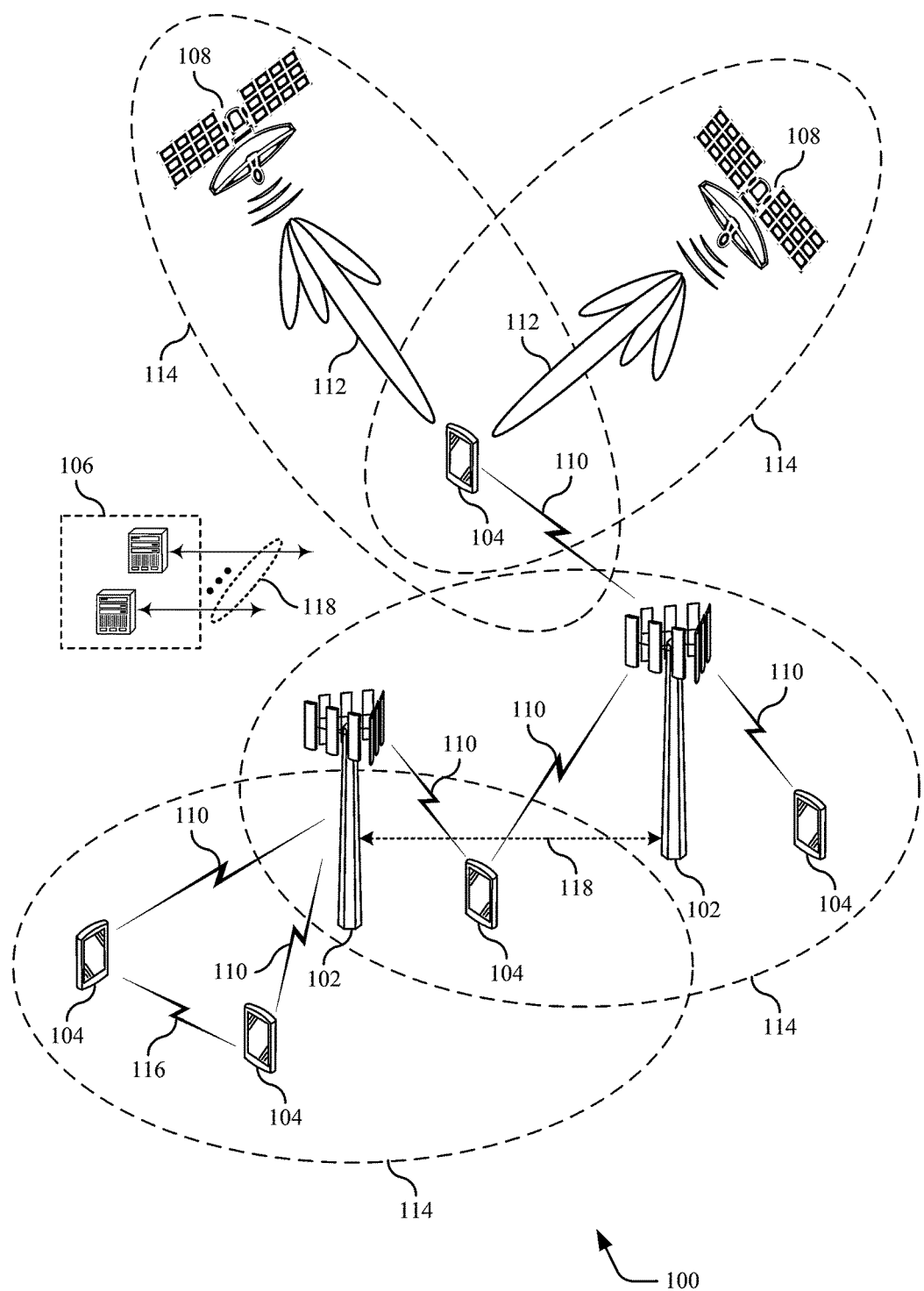
FIG. 1 illustrates an example of a wireless communications system that supports group-based connection release in accordance with aspects of the present disclosure.

Implementations of group-based connection release are described, such as related to a group-based radio resource control (RRC) connection release procedure, which can be utilized to simultaneously redirect a group of multiple UEs to a different frequency layer. This facilitates offloading a large number of the UEs connected with one serving cell to a neighboring serving cell of another frequency layer, or of another radio access technology (RAT), in order to turn off a network node, such as to accommodate power saving and/or interference management. Switching multiple UEs in a serving cell simultaneously from an RRC connected state to an RRC inactive state may also facilitate performing feeder link switching in non-terrestrial network (NTN) and/or changing a serving cell for a mobile integrated access and backhaul (IAB)-node.

Aspects of this disclosure provide detailed signaling methods (e.g., procedures, techniques) enabling a group-based RRC connection release procedure. In aspects of the disclosure, a UE can receive a group RRC release message based on a configured group identity, where the group RRC release message may include multiple RRC connection suspend configurations and/or multiple redirected carrier configurations. The UE can determine to enter into an RRC inactive state, such as if the UE identifies a RRC connection suspend configuration intended or directed to the UE in the received group RRC release message. Otherwise, the UE can enter into an RRC idle state. The UE may further receive, in the RRC connection suspend configuration, information of a preferred serving cell and a scheduled time (e.g., UTC) or a scheduled time window during which the UE can send a RRC resume request message to the preferred cell for any access category. If the UE enters into the RRC idle state, then the UE can determine one or more redirected carrier configurations assigned to the UE among the multiple redirected carrier configurations.

In aspects of the group-based RRC release procedure, a network entity can indicate to a particular UE in a group of multiple UEs, via an RRC connection suspend configuration in a group RRC release message, a preferred serving cell and the corresponding timing information (e.g., as UTC) or timing window information (e.g., a window start time as UTC and a timer duration) for the particular UE to initiate an RRC connection resume procedure, while also indicating to other UEs in the group of multiple UEs to switch to an RRC idle state. This provides that the UE, which potentially may have on-going data traffics in a previous serving cell, can resume the RRC connection quickly once a new NTN cell is available after feeder link switching. Further, the group RRC release message reduces signaling overhead by providing a subset of UEs entering into the RRC inactive state with common configurations, such as RAN notification area information and RAN paging cycle. Similarly, the group RRC release message reduces signaling overhead by providing a group of multiple UEs entering into the RRC inactive state or the RRC idle state with common configurations.

Aspects of the present disclosure are described in the context of a wireless communications system. Aspects of the present disclosure are further illustrated and described with reference to device diagrams and flowcharts that relate to group-based connection release.

FIG. 1 illustrates an example of a wireless communications system 100 that supports group-based connection release in accordance with aspects of the present disclosure. The wireless communications system 100 may include one or more base stations 102, one or more UEs 104, a core network 106, and one or more non-terrestrial stations (NTSs) 108, such as satellite access nodes. The wireless communications system 100 may support various radio access technologies (RATs). In some implementations, the wireless communications system 100 may be a 4G network, such as an LTE network or an LTE-A network. In some other implementations, the wireless communications system 100 may be a 5G network, such as a NR network. In other implementations, the wireless communications system 100 may be a combination of a 4G network and a 5G network. The wireless communications system 100 may support RATs beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be, or include, or may be referred to as a base transceiver station, an access point, a NodeB, an eNB, a gNB, or other suitable terminology. A base station 102 and a UE 104 may communicate via a communication link 110, which may be a wireless or wired connection. For example, a base station 102 and a UE 104 may perform wireless communication over a NR-Uu interface. The one or more NTSs 108 described herein may be or include any type of TRPs (which may be onboard geostationary and/or geo-synchronous (GEO) satellites), MEO satellites, LEO satellites, HAPS, UAV, aircraft, or any other vehicle travelling in the earth's atmosphere, orbiting in outer space, and the like. Any entity referred to as a non-terrestrial station (NTS) in the present disclosure may be referring to a satellite, a satellite access node, NTN node, NG-RAN node, NT-TRP, NTN TP, NTN RP, and similar type entities. A NTS 108 and a UE 104 may communicate via a communication link 112, which may be a wireless connection via a transmission beam and/or a reception beam.

A base station 102 and/or a NTS 108 may provide a geographic coverage area 114 for which the base station 102 and/or the NTS 108 may support services (e.g., voice, video, packet data, messaging, broadcast, etc.) for one or more UE 104 within the geographic coverage area. For example, a base station 102 and a UE 104 may support wireless communication of signals related to services (e.g., voice, video, packet data, messaging, broadcast, etc.) according to one or multiple radio access technologies. Similarly, a NTS 108 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite associated with an NTN. In some implementations, different geographic coverage areas 114 associated with the same or different radio access technologies may overlap, and different geographic coverage areas 114 may be associated with different base stations 102 and/or with different NTSs 108. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 114 of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100, such as a very small aperture terminal (VSAT), which may be connected to one or multiple other network nodes serving other UEs. In other implementations, a UE 104 may be mobile in the wireless communications system 100, such as an earth station in motion (ESIM).

The one or more UEs 104 may be devices in different forms or having different capabilities. A UE 104 may be capable of communicating with various types of devices, such as the base stations 102, other UEs 104, NTSs 108, or network equipment (e.g., the core network 106, a relay device, a gateway device, an integrated access and backhaul (IAB) node, a location server that implements the location management function (LMF), or other network equipment). Additionally, or alternatively, a UE 104 may support communication with other base stations 102 or UE 104, which may act as relays in the wireless communications system 100.

A UE 104 may also support wireless communication directly with other UE 104 over a communication link 116. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 116 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 118 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 and/or NTSs 108 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as a radio heads, smart radio heads, gateways, TRPs, and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

In at least one implementation, one or more of the UEs 104, the base stations 102, and/or one or more of the NTSs 108 are operable to implement various aspects of group-based connection release, as described herein. For instance, leveraging the described techniques, a network entity, such as a base station 102, a gNB, an NTN gateway, a logical function, or any other type of terrestrial or non-terrestrial network entity, is operable to generate and communicate a group-based radio resource control (RRC) connection release to a group of multiple UEs 104.

A group-based RRC connection release procedure can be implemented to simultaneously redirect a group of multiple UEs to a different frequency layer, which facilitates offloading a large number of the UEs connected with one serving cell to a neighboring serving cell of another frequency layer, or of another radio access technology (RAT), in order to turn off a network node, such as to accommodate power saving and/or interference management. Switching multiple UEs in a serving cell simultaneously from an RRC connected state to an RRC inactive state may also facilitate performing feeder link switching in non-terrestrial network (NTN) and/or changing a serving cell for a mobile integrated access and backhaul (IAB)-node. For example, in an NTN, a feeder link of a satellite may need to be switched from one NTN gateway (GW) to another. This may occur due to maintenance, data traffic offloading, and/or due to the satellite moving out of visibility with respect to the current NTN GW.

Figure 2:
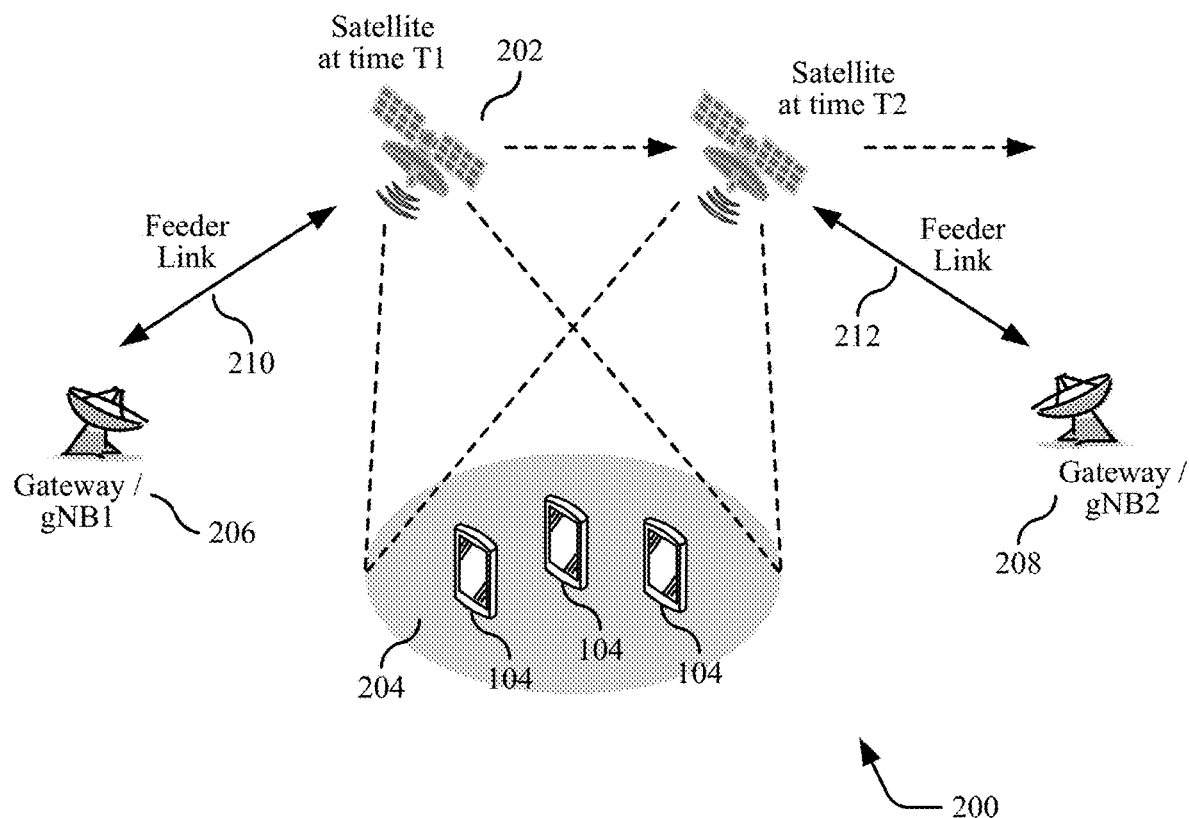
FIG. 2 illustrates an example of a feeder link switch in an NTN due to movement of satellites, as related to UE connection release in accordance with aspects of the present disclosure.

FIG. 2 illustrates an example 200 of a feeder link switch in an NTN due to movement of a satellite 202 (or satellites), as related to a group 204 of multiple UEs 104, and group-based connection release in accordance with aspects of the present disclosure. In an NTN architecture, gNBs are located as ground base stations (e.g., terrestrial), whereby the feeder link switch is a switch from a gNB1 206 to a gNB2 208. The NTN cell provided by the satellite and gNB1 may not be available during the feeder link switching procedure for the satellite (e.g., switching from feeder link 210 to feeder link 212). Accordingly, all of the UEs 104 served by the satellite 202 and gNB1 206 may have to be disconnected from the current NTN cell provided by the satellite and gNB1, and may then need to select and connect to a new serving cell in a short duration of time. Similar to NTN feeder link switching, a mobile IAB-node may have to switch from one parent IAB-node or one IAB-donor to another and accordingly, may have to change an IAB-DU cell configuration (e.g., cell identity, synchronization signal and/or physical broadcast channel block (SSB) beams). All of the UEs and/or a child IAB-node served by the IAB-DU cell may have to reselect a serving cell in a short duration of time.

In aspects of the group-based RRC release procedure, a network entity can indicate to a particular UE 104 in the group 204 of multiple UEs, via an RRC connection suspend configuration in a group RRC release message, a preferred serving cell and the corresponding timing information (e.g., as UTC) or timing window information (e.g., a window start time as UTC and a timer duration) for the particular UE to initiate an RRC connection resume procedure, while also indicating to other UEs in the group of multiple UEs to switch to an RRC idle state. This provides that the UE, which potentially may have on-going data traffics in a previous serving cell, can resume the RRC connection quickly once a new NTN cell is available after feeder link switching. Further, the group RRC release message reduces signaling overhead by providing a subset of UEs entering into the RRC inactive state with common configurations, such as RAN notification area information and RAN paging cycle. Similarly, the group RRC release message reduces signaling overhead by providing a group of multiple UEs entering into the RRC inactive state or the RRC idle state with common configurations, such as cellReselectionPriorities, deprioritisationReq, and/or measIdleConfig.

In previous NR (conventionally), an individual UE may enter into the RRC inactive state when triggered by reception of a RRCRelease message that includes a waitTime, where the UE starts timer T302 with the value set to the waitTime and informs upper layers that access barring is applicable for all access categories, except categories zero ('0') (i.e., mobile originated signaling resulting from paging) and two ('2') (i.e., emergency access). Further, the UE stops timer T390 for all access categories (if running). If the timer T390 corresponding to an access category other than two ('2') expires or is stopped, and if timer T302 is not running, then the UE considers the barring for this access category to be alleviated. For access category two ('2'), if the timer T390 corresponding to the access category two ('2') expires or is stopped, the UE considers the barring for this access category to be alleviated. When barring for an access category is considered as having been alleviated, the UE informs upper layers about barring alleviation for the access category. If barring is alleviated for access category two ('2') or for access category eight ('8') (i.e., mobile originated signaling on RRC level resulting from other than paging), then the UE performs a RAN-based notification area update procedure (i.e., initiating RRC connection resume procedure with resume Cause value set to ma-Update).

Additionally, a UE entering into the RRC idle state or the RRC inactive state triggered by conventional reception of a RRCRelease message that includes measIdleConfig selects a serving cell, and if a serving frequency of the selected cell does not match with a carrierFreq of an entry in the validnyAreaList, or a physical cell identity of the selected cell does not match with any entry in validi CellList (if the serving frequency matches with a carrierFreq of an entry in the validnyAreaList and the validityCellList is included in that entry), then the UE stops timer T331 and releases stored idle or inactive measurement configurations. The timers T320, T325, and T331 start, stop, and expiry operations are shown below:

| Timer | Start | Stop | At expiry |
|---|---|---|---|
| T320 | Upon reception of t320 or upon cell (re)selection to NR from another RAT with validity time configured for dedicated priorities (in which case the remaining validity time is applied). | Upon entering RRC_CONNECTED, upon reception of RRCRelease, when PLMN selection or SNPN selection is performed on request by NAS, when the UE enters RRC_IDLE from RRC_INACTIVE, or upon cell (re)selection to another RAT (in which case the timer is carried on to the other RAT). | Discard the cell reselection priority information provided by dedicated signaling. |

| Timer | Start | Stop | At expiry |
|---|---|---|---|
| T325 | Upon reception of RRCRelease message with deprioritisationTimer. | | Stop deprioritization of all frequencies or NR signaled by RRCRelease. |
| T331 | Upon receiving RRCRelease message with measIdleDuration | Upon receiving RRCSetup, RRCResume, RRCRelease with idle/inactive measurement configuration, upon cell selection/reselection to a cell that does not belong to the validityArea (if configured), or upon cell re-selection to another RAT. | Perform specified actions |

With reference to signaling radio bearers (SRBs), they are defined as radio bearers (RBs) that are used only for the transmission of RRC and NAS messages. More specifically, the following SRBs are defined: SRB0 is for RRC messages using the CCCH logical channel; SRB1 is for RRC messages (which may include a piggybacked NAS message) as well as for NAS messages prior to the establishment of SRB2, all using DCCH logical channel; and SRB2 is for NAS messages and for RRC messages which include logged measurement information, all using DCCH logical channel. The SRB2 has a lower priority than SRB1 and may be configured by the network after AS security activation, and SRB3 is for specific RRC messages when a UE is in (NG)EN-DC or NR-DC, all using DCCH logical channel. In downlink, piggybacking of NAS messages is used only for one dependent (i.e., with a joint success or failure) procedure, the bearer establishment, modification, or release. The uplink piggybacking of NAS messages is used only for transferring the initial NAS message during connection setup and connection resume. The NAS messages transferred via SRB2 are also contained in RRC messages, which however do not include any RRC protocol control information. Once AS security is activated, all RRC messages on SRB1, SRB2 and SRB3, including those containing NAS messages, are integrity protected and ciphered by PDCP. NAS independently applies integrity protection and ciphering to the NAS messages. Split SRB is supported for all the MR-DC options in both SRB1 and SRB2 (split SRB is not supported for SRB0 and SRB3). For operation with shared spectrum channel access, SRB0, SRB1 and SRB3 are assigned with the highest priority channel access priority class (CAPC) (i.e., CAPC=1), while CAPC for SRB2 is configurable.

Figure 3:
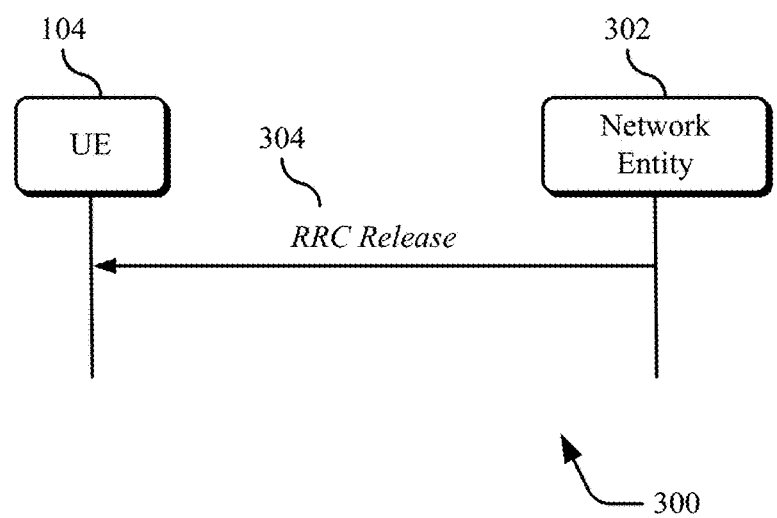
FIG. 3 illustrates an example of a network entity signaling a UE for radio resource control (RRC) release, as related to UE connection release in accordance with aspects of the present disclosure.

FIG. 3 illustrates an example 300 of a network entity signaling a UE 104 for radio resource control (RRC) release, as related to UE connection release for a UE in a wireless communications system. The purpose of the RRC connection release procedure is to release the RRC connection, which includes the release of the established radio bearers, BH RLC channels, as well as all radio resources; or to suspend the RRC connection only if SRB2 and at least one DRB or, for IAB, then SRB2 are setup, which includes the suspension of the established radio bearers. The network entity 302 can initiate the RRC connection release procedure as the RRCRelease message 304 to initiate switching the UE 104 in an RRC connected state to the RRC idle state; or to initiate switching the UE 104 in the RRC connected state to the RRC inactive state, only if SRB2 and at least one DRB or, for IAB, then SRB2 is setup in the RRC connected state; or to switch the UE in the RRC inactive state back to the RRC inactive state when the UE tries to resume; or to switch the UE in the RRC inactive state to the RRC idle state when the UE tries to resume. The procedure can also be used to release and redirect a UE to another frequency.

With reference to the UE 104 receiving the RRC connection release message 304 (RRCRelease), the UE is implemented to delay the following actions sixty (60) ms from the moment the RRCRelease message was received, or optionally when lower layers indicate that the receipt of the RRCRelease message has been successfully acknowledged, whichever is earlier. The UE stops timer T380 (if running); stops timer T320 (if running); if timer T316 is running, then stop the timer T316 and clear the information included in VarRLF-Report (if any). The UE also stops timer T350 (if running). If the AS security is not activated, then the UE may ignore any field included in the RRCRelease message except waitTime, and perform the actions upon entering into the RRC idle state with the release cause indicated as 'other' upon which the procedure ends.

If the RRCRelease message includes redirectedCarrierInfo indicating redirection to eutra, and if cnType is included, and after the cell selection, then the UE can indicate the available CN type(s) and the received cnType to upper layers. Noting that handling the case if the E-UTRA cell selected after the redirection does not support the core network type specified by the cnType, is up to UE implementation. Further, if voiceFallbackIndication is included, then the UE considers that the RRC connection release was for EPS fallback for IMS voice. If the RRCRelease message includes the cellReselectionPriorities, then the UE can store the cell reselection priority information provided by the cellReselectionPriorities; and if t320 is included, then start the timer T320, with the timer value set according to the value of t320; else: the UE can apply the cell reselection priority information broadcast in the system information. If deprioritisationReq is included and the UE supports RRC connection release with deprioritisation, the UE can start or restart timer T325 with the timer value set to the deprioritisationTimer signalled, and store the deprioritisationReq until T325 expiry.

If the RRCRelease includes the measIdleConfig, and if T331 is running, the UE can stop timer T331 and perform the specified actions. If the RRCRelease includes the measIdleConfig, and if the measIdleConfig is set to setup, the UE can store the received measIdleDuration in VarMeasIdleConfig, and start timer T331 with the value set to measIdleDuration; if the measIdleConfig contains measIdleCarrierListNR, the UE can store the received measIdle- CarrierListNR in VarMeasIdleConfig; if the measIdleConfig contains measIdleCarrierListEUTRA, the UE can store the received measIdleCarrierListEUTRA in VarMeasIdleConfig; if the measIdleConfig contains validityAreaList, the UE can store the received validityAreaList in VarMeasIdleConfig.

If the RRCRelease includes suspendConfig, the UE can apply the received suspendConfig, remove all the entries within VarConditionalReconfig (if any), and for each measId, if the associated reportConfig has a reportType set to condTriggerConfig, for the associated reportConfigId, remove the entry with the matching reportConfigId from the reportConfigList within the VarMeasConfig; if the associated measObjectId is only associated to a reportConfig with reportType set to condTriggerConfig, remove the entry with the matching measObjectId from the measObjectList within the VarMeasConfig, and remove the entry with the matching measId from the measIdList within the VarMeasConfig. The UE can reset MAC and release the default MAC Cell Group configuration (if any), and re-establish RLC entities for SRB1.

If the RRCRelease message with suspendConfig was received in response to an RRCResumeRequest or an RRCResumeRequest1, the UE can stop the timer T319 (if running), and in the stored UE inactive AS context, replace the $K_{gNB}$ and $K_{RRCint}$ keys with the current $K_{gNB}$ and $K_{RRCint}$ keys; replace the C-RNTI with the C-RNTI used in the cell that the UE has received the RRCRelease message; replace the cellIdentity with the cellIdentity of the cell that the UE has received the RRCRelease message; and replace the physical cell identity with the physical cell identity of the cell in which the UE has received the RRCRelease message; else: store in the UE inactive AS context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured), and all other parameters configured except for: parameters within ReconfigurationWithSync of the PCell; parameters within ReconfigurationWithSync of the NR PSCell, if configured; parameters within MobilityControlInfoSCG of the E-UTRA PSCell, if configured; and servingCellConfigCommonSIB. Noting that the NR sidelink communication related configurations and logged measurement configuration are not stored as UE inactive AS context, when the UE enters the RRC inactive state.

The UE can suspend all SRB(s) and DRB(s), except SRB0; indicate PDCP suspend to lower layers of all DRBs; if the t380 is included, then start timer T380, with the timer value set to t380; if the RRCRelease message is including the waitTime, start timer T302 with the value set to the waitTime, and inform upper layers that access barring is applicable for all access categories except categories zero ('0') and two ('2'); if T390 is running, stop timer T390 for all access categories, and perform the specified actions. The UE can indicate the suspension of the RRC connection to upper layers, and enter the RRC inactive state and perform cell selection; else perform the actions upon entering into RRC idle with the release cause indicated as 'other'.

With reference to T320 expiry, the UE is implemented to, if T320 expires and if stored, discard the cell reselection priority information provided by the cellReselectionPriorities or inherited from another RAT, apply the cell reselection priority information broadcast in the system information. The UE can perform the actions upon entering into the RRC idle state, with the release cause indicated as 'other'.

With reference to UE actions upon entering into the RRC idle state, the UE is implemented to reset MAC; set the variable pendingRNA-Update to false, if that is set to true; if entering into the RRC idle state was triggered by reception of the RRCRelease message including a waitTime, and if T302 is running, stop timer T302; start timer T302 with the value set to the waitTime; inform upper layers that access barring is applicable for all access categories except categories zero('0') and two ('2'), else: if T302 is running, stop timer T302 and perform the specified actions. If T390 is running, stop timer T390 for all access categories and perform the specified actions.

If the UE is leaving or exiting the RRC inactive state, and if entering into the RRC idle state was not triggered by reception of the RRCRelease message: if stored, discard the cell reselection priority information provided by the cellReselectionPriorities, and stop the timer T320 (if running); the UE can stop all timers that are running except T302, T320, T325, T330, T331 and T400; discard the UE inactive AS context, if any; release the suspendConfig, if configured; and remove all the entries within VarConditionalReconfig, if any. For each measId, if the associated reportConfig has a reportType set to condTriggerConfig, and for the associated reportConfigId, remove the entry with the matching reportConfigId from the reportConfigList within the VarMeasConfig. If the associated measObjectId is only associated to a reportConfig with reportType set to condTriggerConfig, remove the entry with the matching measObjectId from the measObjectList within the VarMeasConfig; and remove the entry with the matching measId from the measIdList within the VarMeasConfig. The UE can also discard the $K_{gNB}$ key, the S-$K_{gNB}$ key, the S-$K_{eNB}$ key, the $K_{RRCenc}$ key, the $K_{RRCint}$ key, the $K_{UPint}$ key and the $K_{UPenc}$ key, if any; as well as release all radio resources, including release of the RLC entity, the BAP entity, the MAC configuration and the associated PDCP entity and SDAP for all established RBs and BH RLC channels; indicate the release of the RRC connection to upper layers together with the release cause; discard any stored segments of segmented RRC messages; and except if entering into the RRC idle state was triggered by inter-RAT cell reselection while the UE is in the RRC inactive state or in the RRC idle state, or when selecting an inter-RAT cell while T311 was running or when selecting an E-UTRA cell for EPS fallback for IMS voice, enter into the RRC idle state and perform cell selection.

In aspects of group-based connection release, a UE may receive a group mobility configuration, such as in a RRCReconfiguration message that includes information of a group identity, a group security key (or security related information and/or parameters applicable to a group of UEs), and/or a UE index or UE identity within a group. For example, the UE may receive information of a first radio network temporary identifier (RNTI) (e.g., cell (C)-RNTI, modulation and coding scheme (MCS)-C-RNTI) used for unicast communications in one or more serving cells. The UE may also receive information of a second RNTI (e.g., Group (G)-RNTI) and the UE index and/or identity associated with a group mobility command (e.g., a group radio resource control (RRC) release message or a group handover command). Alternatively, a UE may receive multiple group mobility configurations broadcast in a system information message, and may determine a group mobility configuration of the multiple group mobility configurations applicable to the UE based on predefined or configured selection criteria, such as based on a selected synchronization signal block (SSB) and/or based on a selected network slice.

In an implementation, a network entity, such as a base station, a gNB, an NTN gateway, a logical function, or any other type of terrestrial or non-terrestrial network entity can determine a group of multiple UEs for a group mobility configuration based on UE locations, UE geometry, spatial coverage (e.g., a serving beam or a selected SSB), and/or supported services and/or network slices.

In an implementation, a UE can determine when to start monitoring a group-common physical downlink control channel (PDCCH) for a group mobility message (e.g., a group RRC release message) based on broadcasted timing information, such as based on when a serving cell is going to stop serving the area, or based on an indicated time duration [t1, t2], which may be determined by the network, such as based on the trajectory of satellites in an NTN, or mobile-integrated access and backhaul (mobile-IAB node). This trajectory information may be computed based on at least one type of ephemeris information, which may be actual, nominal, or a combination thereof, as determined by a specification, configuration, or implementation. For network node(s) that are mobile, their location may be computed based on a trajectory obtained by actual or nominal ephemeris information of the network node(s), or by a combination of the actual and nominal ephemeris information. In another example, a UE may receive a search space set activation/deactivation indication (via MAC CE or DCI) for a search space set associated with a group-common PDCCH of a group mobility message. The UE can initiate monitoring the group-common PDCCH of the group mobility message based on the received search space set activation indication, or the UE can stop monitoring the group-common PDCCH of the group mobility message based on the received search space set deactivation indication.

FIGS. 4 and 5 illustrate an example of a group RRC release message 400 (GroupRRCRelease) that supports group-based connection release in accordance with aspects of the present disclosure. In aspects of group-based connection release, a UE can receive a group RRC release message (e.g., the example GroupRRCRelease message 400) that commands a group of multiple UEs, including the UE, to change or switch to an RRC inactive state and/or to an RRC idle state, based on a group configuration applicable to the UE. For example, the UE is configured with a group identity and a PDCCH monitoring configuration (i.e., a search space and a corresponding control resource set (CORESET) for a downlink control information (DCI) format) associated with the group identity (e.g., G-RNTI). The UE can monitor based on the PDCCH monitoring configuration and the UE detects the DCI format of a group common PDCCH that has a cyclic redundancy check (CRC) scrambled with G-RNTI. The UE can further receive a physical downlink shared channel (PDSCH) carrying the group RRC release message based on the detected DCI format that includes scheduling information for the PDSCH. The group RRC release message may include multiple RRC connection suspend configurations, such as a list of configurations for an RRC inactive state (e.g., a parameter suspendConfigurationSet including suspendConfigList as shown at 402) for a subset of UEs from the group of multiple UEs configured with the same group identity. The group RRC release message may include multiple redirected carrier configurations (e.g., a parameter redirectedCarrierInfoList as shown at 404), where each redirected carrier configuration corresponds to a subset of UEs from the group of multiple UEs with the same group identity.

If a network turns off a particular network node only when there is no on-going data traffic, there is less of a chance to turn off the network node for energy saving and/or interference management. However, if the network node can be turned off even with on-going data traffics (e.g., with a light traffic load of data packet communications), more network energy saving may be achieved. In an example, a network entity may send a group RRC release message to a first group of UEs with best-effort data traffics or applications (e.g., data traffics tolerant to latency, jitter, and/or packet loss) indicating to switch to an RRC inactive state, while sending a group handover command to a second group of UEs with data traffics or applications of strict Quality of Service (QoS) requirements (e.g., data traffics sensitive to latency, jitter, and/or packet loss). Further, the network entity may switch some of UEs receiving the group RRC release message which do not have on-going data traffics, or UEs in an RRC inactive state, to an RRC idle state. This allows for more of a chance to turn off a network node without causing potential random access congestion problems due to all of the UEs served by the network node to perform handover simultaneously. By forcing UEs with the best-effort data traffics or applications, or UEs without on-going data traffic, to enter into an RRC idle or an RRC inactive state for a short period of time, the network entity may be able to accommodate the UEs with applications of stricter QoS requirements to switch to a new serving cell quickly, and can guarantee less interruption.

In an implementation, a network entity may provide a list of RRC connection suspend configurations in a group RRC release message for a subset of UEs selected from a group of multiple UEs associated with the group RRC release message, where the subset of UEs may be in an RRC connected state, and additionally may have on-going communications, such as data traffics or applications with strict QoS requirements. In an example, a RRC connection suspend configuration in the group RRC release message may include information of an earliest time as coordinated universal time (UTC) (e.g., a parameter utc-RRC-Resume as shown at 502) or a time window (e.g., a window start time as UTC and a window duration (or timer duration)) when a corresponding UE can initiate a RRC connection resume procedure. Further, the RRC connection suspend configuration can include a cell identity of a preferred cell for the RRC connection resume procedure (e.g., a parameter rrc-ResumeCell as shown at 504). This information can facilitate the UE (potentially with on-going data traffics in a previous serving cell) resuming the RRC connection quickly, once a new serving cell is available to serve the UE. If the timing information (e.g., the UTC or UTC together with a timer duration) is included in an RRC connection suspend configuration, a corresponding UE for the RRC connection suspend configuration may ignore a parameter waitTime in the group RRC release message, which configures access barring for all access categories except categories zero ('0') and two ('2') for the indicated duration.

If a UE identifies a configuration for an RRC inactive state intended or directed to the UE (e.g., a parameter SuspendConfig-r18 that includes suspendConfigID set to a UE index or identity of the UE, as shown at 506) in a group RRC release message, the UE can perform actions related to entering into the RRC inactive state. For example, the UE applies the received SuspendConfig-r18; removes all of the entries within VarCondilionalReconfig (if any); resets medium access control (MAC) and releases the default MAC Cell Group configuration (if any); and re-establishes radio link control (RLC) entities for SRB1. The UE also stores in the UE inactive access stratum (AS), context current $K_{gNB}$ and $K_{RRCint}$ keys, a robust header compression (ROHC) state, stored QoS flow to data radio bearer (DRB) mapping rules, the C-RNTI used in the source PCell, the cellIdentay and the physical cell identity of the source PCell, the spCellConfigCommon within ReconfigurationWithSync of the NR PSCell (if configured), and all other parameters configured except for parameters within Reconfiguration-WahSync of the PCell and of the NR PSCell, parameters within MobilityControlInfoSCG of the E-UTRA PSCell, and servingCellConfigCommonSIB. Further, the UE can suspend all signalling radio bearers (SRBs) and data radio bearers (DRBs) except SRB0, indicate the packet data convergence protocol (PDCP) suspend to lower layers of all DRBs, indicate the suspension of the RRC connection to upper layers, enter into the RRC inactive state, and perform serving cell selection.

In an example, a RRC connection suspend configuration in the group RRC release message may include information of a condition or event (e.g., a threshold related to the current serving cell link quality) when a corresponding UE should execute the RRC connection release based on a corresponding RRC connection suspend configuration (e.g., the SuspendConfig-r18 at 506) and transition to the RRC inactive state. In an implementation, a conditional release may be introduced, where the conditional release, such as to the RRC inactive state, is by a corresponding UE in the group when one or more release conditions are met, such as the UE transitioning to the RRC inactive state if the current serving cell quality drops below a configured threshold. The UE can start evaluating the execution condition(s) upon receiving the conditional group release configuration, and the UE stops evaluating the execution condition(s) once a release is executed, such as a transition to the RRC inactive state. In an example, a single reference signal type is supported for the conditional group release and at most, two different trigger quantities (e.g., reference signal received power (RSRP) and reference signal received quality (RSRQ), RSRP and signal-to-interference and noise ratio (SINR), etc.) can be configured simultaneously for the evaluation of conditional group release execution conditions of the serving cell. In another implementation, one or more release conditions to switch to the RRC idle state, which are common to a group of UEs or a subset of UEs in the group of multiple UEs, can be included in a group RRC release message.

| GroupRRCRelease-IEs field descriptions |
|---|
| cnType<br>Indicate that a subset of UEs associated with a given RedirectedCarrier-Info<br>is redirected to EPC or 5GC.<br>deprioritisationReq<br>Indicates whether the current frequency or RAT is to be de-prioritised.<br>deprioritisationTimer<br>Indicates the period for which either the current carrier frequency<br>or NR is deprioritised. Value minN corresponds to N minutes.<br>measIdleConfig<br>Indicates measurement configuration to be stored and used by a<br>group of UEs while in RRC_IDLE or RRC_INACTIVE.<br>suspendConfig<br>Indicates configuration for the RRC_INACTIVE state. The network<br>does not configure suspendConfig when the network redirect the UE<br>to an inter-RAT carrier frequency or if the UE is configured with<br>a DAPS bearer.<br>redirectedCarrierInfo<br>Indicates a carrier frequency (downlink for FDD) and is used to<br>redirect a subset of UEs going to RRC_IDLE to an NR or an<br>inter-RAT carrier frequency, by means of cell selection at<br>transition to RRC_IDLE. |

| CarrierInfoNR field descriptions |
|---|
| carrierFreq<br>Indicates the redirected NR frequency.<br>ssbSubcarrierSpacing<br>Subcarrier spacing of SSB in the redirected SSB frequency.<br>Only the values 15 kHz or 30 kHz (FR1), and 120 kHz or<br>240 kHz (FR2) are applicable.<br>smtc<br>The SSB periodicity/offset/duration configuration for the<br>redirected SSB frequency. It is based on timing reference<br>of PCell. If the field is absent, the UE uses the SMTC<br>configured in the measObjectNR having the same SSB frequency<br>and subcarrier spacing. |

| SuspendConfigurationSet field descriptions |
|---|
| ran-NotificationAreaInfo<br>Network ensures that a subset of UEs in RRC_INACTIVE always<br>have a valid ran-NotificationAreaInfo. This parameter is common<br>to a subset of UEs going to RRC_INACTIVE.<br>ran-PagingCycle<br>Refers to the UE specific cycle for RAN-initiated paging. Value<br>rf32 corresponds to 32 radio frames, value rf64 corresponds to<br>64 radio frames and so on. This parameter is common to a subset<br>of UEs going to RRC_INACTIVE.<br>t380<br>Refers to the timer that triggers the periodic RNAU procedure in<br>UE. Value min 5 corresponds to 5 minutes, value min 10 corresponds<br>to 10 minutes and so on.<br>utc-RRC-Resume<br>Coordinated Universal Time corresponding to when the UE can initiate<br>a RRC resume procedure. The field counts the number of UTC seconds<br>in 10 ms units since 00:00:00 on Gregorian calendar date 1 Jan.<br>1900 (midnight between Sunday, Dec. 31, 1899 and Monday,<br>Jan. 1, 1900). |

Figure 6:
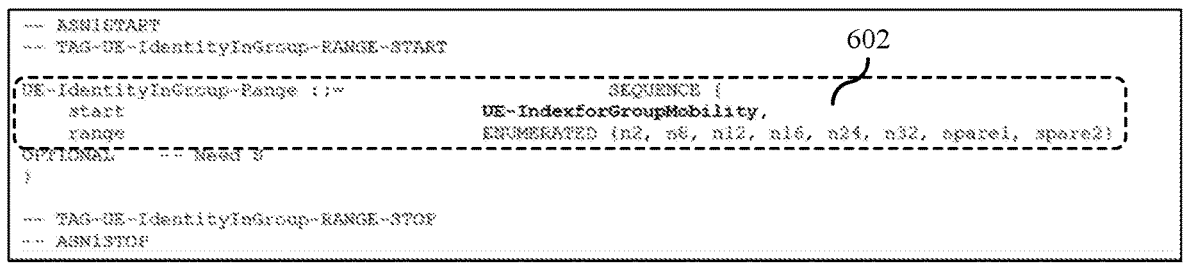
FIG. 6 illustrates an example of a UE-IdentityInGroup-Range information element that supports group-based connection release in accordance with aspects of the present disclosure.

FIG. 6 illustrates an example of a UE-IdentityInGroup-Range information element 600 that supports group-based connection release in accordance with aspects of the present disclosure. The UE-IdentityInGroup-Range information element 600 is used to encode either a single or a range of UE identities within a group of UEs. The range is encoded by using a start value and by indicating the number of consecutive UE identities (including start) in the range. The Network may configure overlapping ranges of UE identities in multiple RedirectedCarrierInfo-r18 parameters in a parameter redirectedCarrierInfoList.

| UE-IdentityInGroup-Range field descriptions |
|---|
| range<br>Indicates the number of UE identities in the range (including start).<br>Value n4 corresponds with 4, value n8 corresponds with 8 and so on.<br>The UE shall apply value 1 in case the field is absent, in which<br>case only the physical cell identity value indicated by start applies.<br>start<br>Indicates the lowest UE identity (i.e., UE index) within a group in<br>the range. |

In an implementation, a network entity may provide a list of redirected carrier information configurations in a group RRC release message for a subset of UEs selected from a group of multiple UEs associated with the group RRC release message. The subset of UEs may be in an RRC inactive state, or may have on-going communications, such as potentially data traffics or applications with relaxed QoS requirements. In an example, a RedirectedCarrierInfo-r18 in the group RRC release message may include information of one or more UE indexes or identities within the group of multiple UEs for which the RedirectedCarrierInfo-r18 is applicable. The information of one or more UE indexes or identities may be provided by a UE identity or index range, as shown at 406 in UE-IdentityInGroup-Range in FIG. 4, and as shown at 602 in FIG. 6. Alternatively, the information of one or more UE indexes or identities may be provided by a bitmap of a length equal to the maximum number of UEs per group. Each bit in the bitmap corresponds to a UE index or identity within a group, where a value of one ('1') in each bit may indicate that the RedirectedCarrierInfo-r18 is applicable to the corresponding UE index or identity, and a value of zero ('0') in a bit indicates that the RedirectedCarrierInfo-r18 is not applicable to the corresponding UE index or identity.

Further, the redirect carrier configuration can include one or more cell identities of corresponding preferred serving cells for cell selection (e.g., a parameter preferredCellList as shown at 408 in FIG. 4). In an implementation, a network entity can provide information of multiple redirect carriers, where each redirect carrier information is intended to a distinctive subset of UEs in the group, which may facilitate load balancing by distributing a group of UEs to different carriers and different serving cells. Since the network entity does not have to redirect all of the UEs in the group of multiple UEs to the same frequency layer, and can indicate each subset of UEs to different frequency layers, periodic or event-triggered intra-frequency and inter-frequency radio resource management (RRM) measurement reports can facilitate the network entity determining the frequency layers for the UEs in the group of multiple UEs. If a UE does not determine a suitable serving cell in a redirected frequency layer, the UE may reselect a serving cell according to an alternate NR cell reselection procedure.

If a group RRC release message does not include a configuration for an RRC inactive state intended or directed to a UE, the UE can perform actions related to entering into the RRC idle state. For example, the UE resets MAC, sets the variable pendingRNA-Update to false (if currently set to true); stops all timers that are running except T302, T320, T325, T330, T331, and T400; discards the UE inactive AS context (if any); releases the suspendConfig (if configured); removes all the entries within VarConditionalReconfig (if any); and discards all configured security keys (e.g., $K_{gNB}$ key, S-$K_{gNB}$ key, S-$K_{eNB}$ key, $K_{RRCenc}$ key, $K_{RRCint}$ key, $K_{UPint}$ key, and $K_{UPenc}$ key). The UE also releases all radio resources, including release of an RLC entity, a BAP entity, a MAC configuration and an associated PDCP entity, as well as SDAP for all established RBs and BH RLC channels. The UE also indicates the release of the RRC connection to upper layers together with the release cause, discards any stored segments of segmented RRC messages, enters RRC IDLE, and performs cell selection.

Responsive to a UE receiving a GroupRRCRelease message to transition the UE, along with other UEs in a group of multiple UEs to RRC IDLE, the UE can attempt to camp on a suitable serving cell according to a RedirectedCarrierInfo-r18 applicable to the UE, if included in the GroupRRCRelease message. If the UE cannot determine a suitable serving cell, the UE is can be allowed to camp on any suitable serving cell of the indicated RAT. If the GroupRRCRelease message does not contain the RedirectedCarrierInfo-r18 applicable to the UE, the UE can attempt to select a suitable serving cell on a carrier given by broadcast information (SIB). If no suitable serving cell is determined as indicated above, the UE can perform serving cell selection using stored information in order to find a suitable serving cell to camp on.

In an implementation, when a UE receives a group RRC release message, the UE considers a source PCell as being barred and does not select the source PCell during a cell selection procedure. In another implementation, the group RRC release message includes an indication as to whether the source PCell is barred for a group of UEs entering into RRC IDLE or RRC INACTIVE and performing a cell selection procedure. In an implementation, a group RRC release message can be transmitted via SRB0 without integrity protection and ciphering. In another implementation, integrity protection and ciphering based on a group security key can be applied to a group RRC release message. The UEs entering into RRC INACTIVE based on a group RRC release message may continue using a UE-specific security key (e.g., the same security key used before entering into RRC INACTIVE), when performing a RRC connection resume procedure responsive to receiving a RRCResume message.

Figure 7:
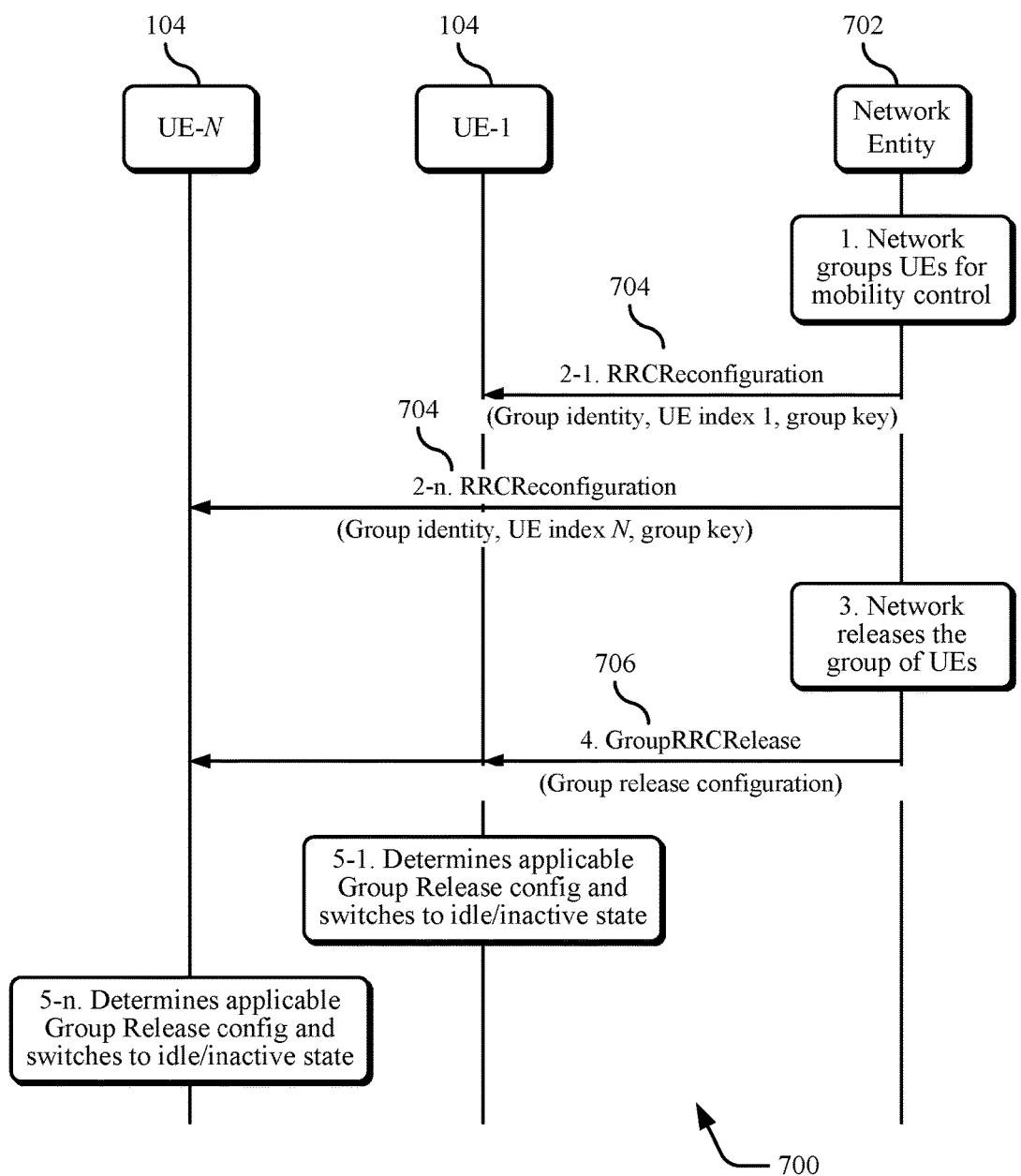
FIG. 7 illustrates an example signaling sequence of messages from a network entity signaling a group of UEs that supports group-based connection release in accordance with aspects of the present disclosure.

FIG. 7 illustrates an example signaling sequence 700 of messages from a network entity 702 signaling a group of UEs 104 that supports group-based connection release in accordance with aspects of the present disclosure. A network entity 702 configures multiple UEs 104, (UE-1, . . . , UE-N) as one group for group mobility procedures, and provides each UE 104 with a group mobility configuration that includes a group identity, a UE index, and a group key (used for ciphering and/or integrity protection) via a dedicated RRCReconfiguration message 704. When the network entity 702 determines to release the group of multiple UEs 104, the network transmits a GroupRRCRelease message 706 that includes a group release configuration. Each UE in the group of multiple UEs 104 can determine an applicable release configuration from the group release configuration and switches to either the RRC inactive state or the RRC idle state.

Figure 8:
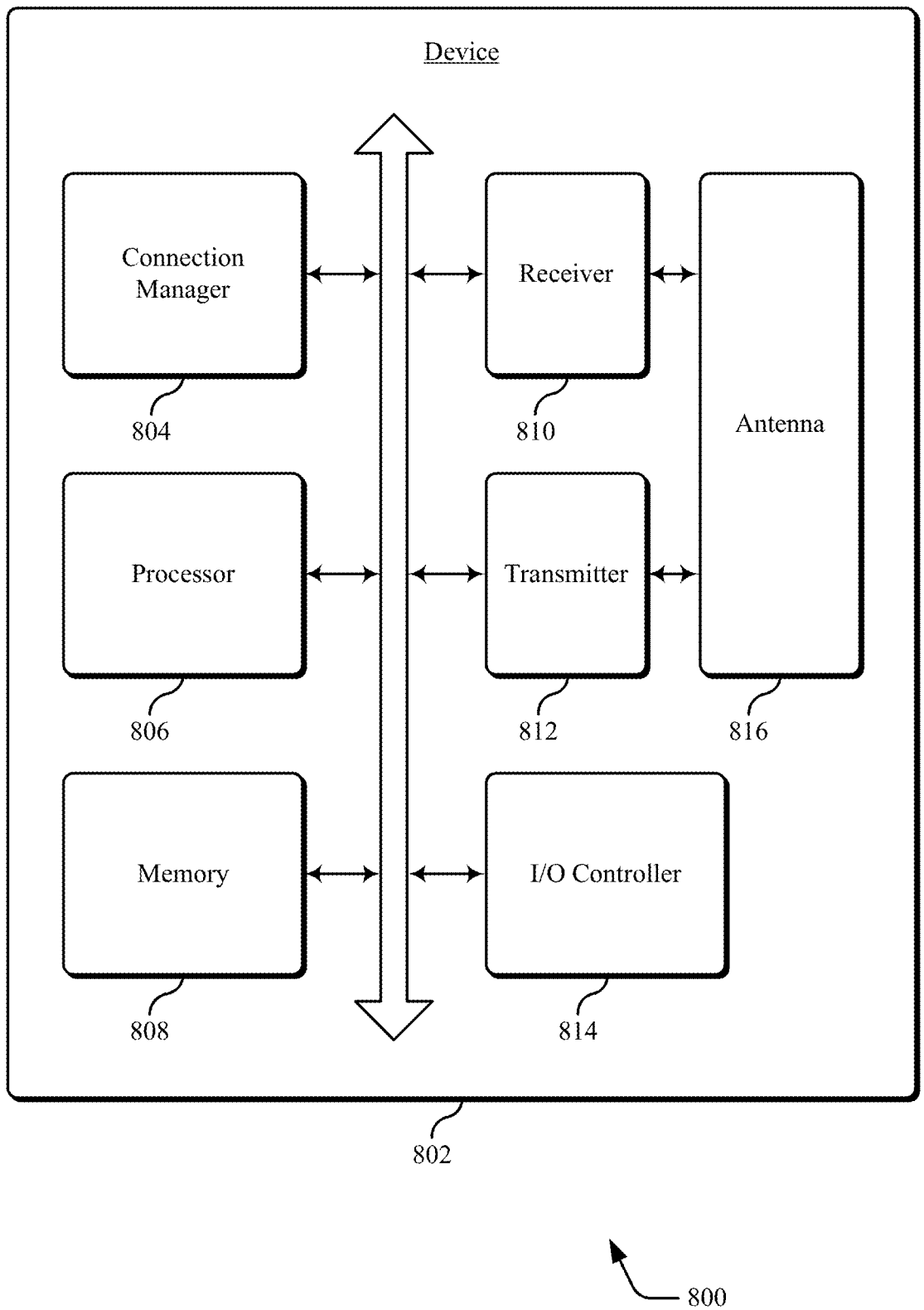
FIG. 8 illustrates an example block diagram of components of a device that supports group-based connection release in accordance with aspects of the present disclosure.

FIG. 8 illustrates an example of a block diagram 800 of a device 802 that supports group-based connection release in accordance with aspects of the present disclosure. The device 802 may be an example of a UE 104 as described herein. The device 802 may support wireless communication with one or more base stations 102, UEs 104, or any combination thereof. The device 802 may include components for bi-directional communications including components for transmitting and receiving communications, such as a connection manager 804, a processor 806, a memory 808, a receiver 810, a transmitter 812, and an I/O controller 814. These components may be in electronic communication or otherwise coupled (e.g., operatively, communicatively, functionally, electronically, electrically) via one or more interfaces (e.g., buses).

The connection manager 804, the receiver 810, the transmitter 812, or various combinations thereof or various components thereof may be examples of means for performing various aspects of the present disclosure as described herein. For example, the connection manager 804, the receiver 810, the transmitter 812, or various combinations or components thereof may support a method for performing one or more of the functions described herein.

In some implementations, the connection manager 804, the receiver 810, the transmitter 812, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 806 and the memory 808 coupled with the processor 806 may be configured to perform one or more of the functions described herein (e.g., by executing, by the processor 806, instructions stored in the memory 808).

Additionally or alternatively, in some implementations, the connection manager 804, the receiver 810, the transmitter 812, or various combinations or components thereof may be implemented in code (e.g., as communications management software or firmware) executed by the processor 806. If implemented in code executed by the processor 806, the functions of the connection manager 804, the receiver 810, the transmitter 812, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the connection manager 804 may be configured to perform various operations (e.g., receiving, monitoring, transmitting) using or otherwise in cooperation with the receiver 810, the transmitter 812, or both. For example, the connection manager 804 may receive information from the receiver 810, send information to the transmitter 812, or be integrated in combination with the receiver 810, the transmitter 812, or both to receive information, transmit information, or perform various other operations as described herein. Although the connection manager 804 is illustrated as a separate component, in some implementations, one or more functions described with reference to the connection manager 804 may be supported by or performed by the processor 806, the memory 808, or any combination thereof. For example, the memory 808 may store code, which may include instructions executable by the processor 806 to cause the device 802 to perform various aspects of the present disclosure as described herein, or the processor 806 and the memory 808 may be otherwise configured to perform or support such operations.

For example, the connection manager 804 may support wireless communication at a device (e.g., the device 802, a UE) in accordance with examples as disclosed herein. The connection manager 804 and/or other device components may be configured as or otherwise support an apparatus, such as a UE, including a receiver to receive a group radio resource control release message that is based on a group mobility configuration, the group radio resource control release message intended for communication to a group of multiple user equipments; a connection manager to: switch to a radio resource control inactive state based in part on a determination that a radio resource control connection suspend configuration directed to the apparatus is included in the group radio resource control release message; switch to a radio resource control idle state based in part on a determination that the radio resource control connection suspend configuration is not included in the group radio resource control release message.

Additionally, the apparatus (e.g., a UE) includes any one or combination of: the group mobility configuration comprises a group identity and an apparatus identity of the apparatus within the group of multiple user equipments, and wherein the group of multiple user equipments are configured with the group identity. To determine that the radio resource control connection suspend configuration is directed to the apparatus, the connection manager is configured to identify that the radio resource control connection suspend configuration includes an indication of the apparatus. The group radio resource control release message includes multiple radio resource control connection suspend configurations for a subset of user equipment in the group of multiple user equipments. The subset of user equipment are configured with a common configuration based on one of radio access network notification area information, a radio access network paging cycle, or a timer triggering a periodic radio access network notification area update procedure. The connection manager is configured to perform a radio resource control connection resume procedure based in part on timing information received in the radio resource control connection suspend configuration directed to the apparatus. The connection manager is configured to: select a serving cell based in part on cell information received in the radio resource control connection suspend configuration directed to the apparatus; and perform a radio resource control connection resume procedure based in part on the selected serving cell. The group radio resource control release message includes multiple redirected carrier information configurations. Responsive to the determination that the radio resource control connection suspend configuration is not included in the group radio resource control release message, the connection manager is configured to: identify that at least one of the multiple redirected carrier information configurations is intended to the apparatus; and select a serving cell based on the at least one identified redirected carrier information configuration. The connection manager is configured to identify that the at least one identified redirected carrier information configuration is intended to the apparatus based in part on the at least one identified redirected carrier information configuration including one or more indications of one or more user equipment including an indication of the apparatus.

The connection manager 804 and/or other device components may be configured as or otherwise support a means for group-based connection release at a UE, including receiving a group radio resource control release message based on a group mobility configuration, the group radio resource control release message intended for communication to a group of multiple user equipments; switching to a radio resource control inactive state based in part on a determination that a radio resource control connection suspend configuration directed to the user equipment is included in the group radio resource control release message; switching to a radio resource control idle state based in part on a determination that the radio resource control connection suspend configuration is not included in the group radio resource control release message.

Additionally, group-based connection release at the UE includes any one or combination of: the group mobility configuration comprises a group identity and a user equipment identity of the user equipment within the group of multiple user equipments, and wherein the group of multiple user equipments are configured with the group identity. The method further comprising identifying that the radio resource control connection suspend configuration includes an indication of the user equipment to determine that the radio resource control connection suspend configuration is directed to the user equipment. The group radio resource control release message includes multiple radio resource control connection suspend configurations for a subset of user equipment from the group of multiple user equipments; and the subset of user equipment are configured with a common configuration based on one of radio access network notification area information, a radio access network paging cycle, or a timer triggering a periodic radio access network notification area update procedure. The method further comprising performing a radio resource control connection resume procedure based in part on timing information received in the radio resource control connection suspend configuration directed to the user equipment. The method further comprising: selecting a serving cell based in part on cell information received in the radio resource control connection suspend configuration directed to the user equipment; and performing a radio resource control connection resume procedure based in part on the selected serving cell. The group radio resource control release message includes multiple redirected carrier information configurations, and responsive to the determination that the radio resource control connection suspend configuration is not included in the group radio resource control release message, the method further comprising: identifying that at least one of the multiple redirected carrier information configurations is intended to the user equipment; and selecting a serving cell based on the at least one identified redirected carrier information configuration.

The processor 806 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 806 may be configured to operate a memory array using a memory controller. In some other implementations, a memory controller may be integrated into the processor 806. The processor 806 may be configured to execute computer-readable instructions stored in a memory (e.g., the memory 808) to cause the device 802 to perform various functions of the present disclosure.

The memory 808 may include random access memory (RAM) and read-only memory (ROM). The memory 808 may store computer-readable, computer-executable code including instructions that, when executed by the processor 806 cause the device 802 to perform various functions described herein. The code may be stored in a non-transitory computer-readable medium such as system memory or another type of memory. In some implementations, the code may not be directly executable by the processor 806 but may cause a computer (e.g., when compiled and executed) to perform functions described herein. In some implementations, the memory 808 may include, among other things, a basic I/O system (BIOS) which may control basic hardware or software operation such as the interaction with peripheral components or devices.

The I/O controller 814 may manage input and output signals for the device 802. The I/O controller 814 may also manage peripherals not integrated into the device 802. In some implementations, the I/O controller 814 may represent a physical connection or port to an external peripheral. In some implementations, the I/O controller 814 may utilize an operating system such as iOS®, ANDROID®, MS-DOS®, MS-WINDOWS®, OS/2®, UNIX®, LINUX®, or another known operating system. In some implementations, the I/O controller 814 may be implemented as part of a processor, such as the processor 806. In some implementations, a user may interact with the device 802 via the I/O controller 814 or via hardware components controlled by the I/O controller 814.

In some implementations, the device 802 may include a single antenna 816. However, in some other implementations, the device 802 may have more than one antenna 816, which may be capable of concurrently transmitting or receiving multiple wireless transmissions. The receiver 810 and the transmitter 812 may communicate bi-directionally, via the one or more antennas 816, wired, or wireless links as described herein. For example, the receiver 810 and the transmitter 812 may represent a wireless transceiver and may communicate bi-directionally with another wireless transceiver. The transceiver may also include a modem to modulate the packets, to provide the modulated packets to one or more antennas 816 for transmission, and to demodulate packets received from the one or more antennas 816.

Figure 9:
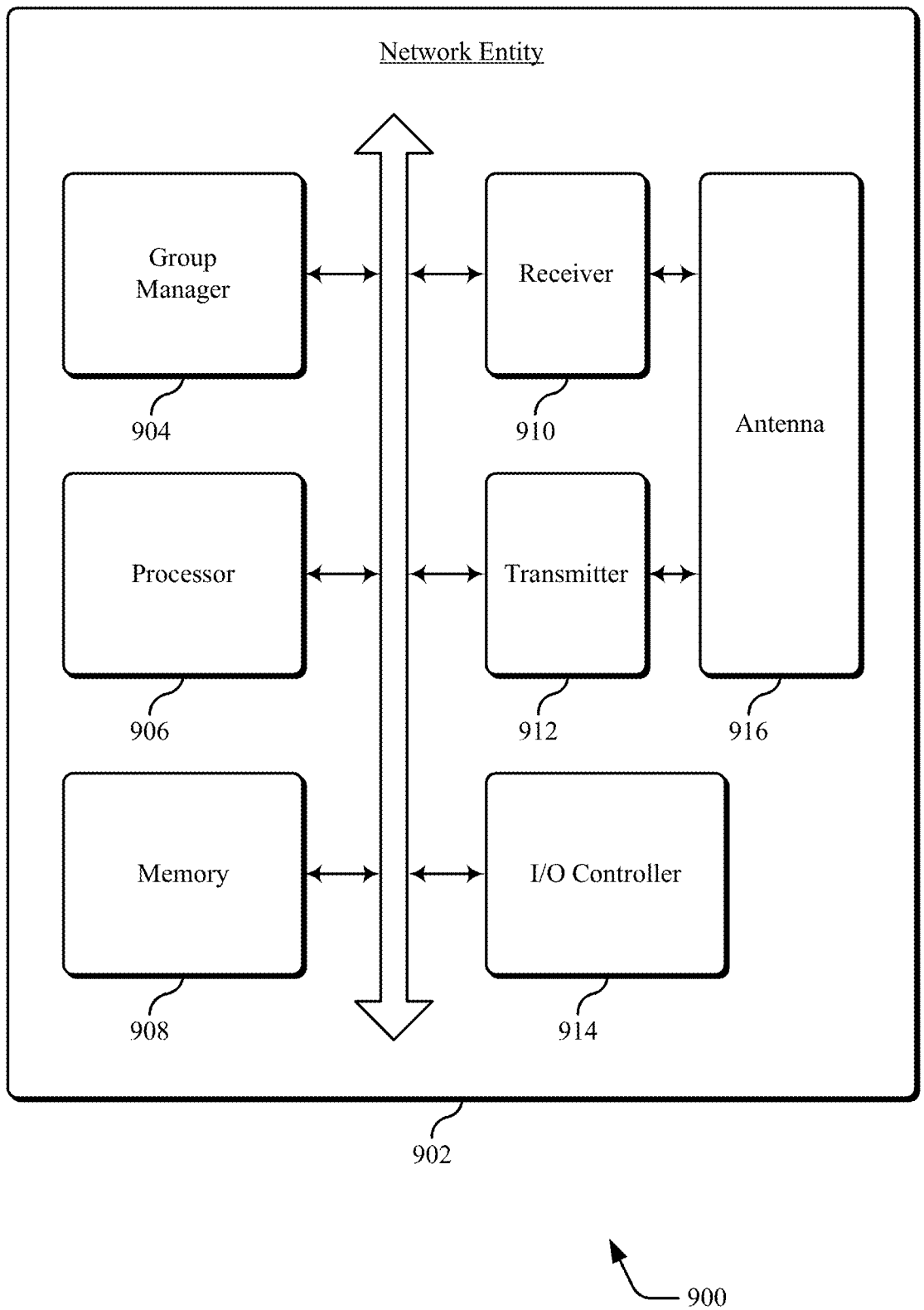
FIG. 9 illustrates an example block diagram of components of a network entity that supports group-based connection release in accordance with aspects of the present disclosure.

FIG. 9 illustrates an example of a block diagram 900 of a device 902 that supports group-based connection release in accordance with aspects of the present disclosure. The device 902 may be an example of a network entity, such as a base station 102, a gNB, an NTN gateway, a logical function, or any other type of terrestrial or non-terrestrial network entity. The device 902 may support wireless communication and/or network signaling with one or more base stations 102, UEs 104, NTSs 108, network entities, or any combination thereof. The device 902 may include components for bi-directional communications including components for transmitting and receiving communications, such as a group manager 904, a processor 906, a memory 908, a receiver 910, a transmitter 912, and an I/O controller 914. These components may be in electronic communication or otherwise coupled (e.g., operatively, communicatively, functionally, electronically, electrically) via one or more interfaces (e.g., buses).

The group manager 904, the receiver 910, the transmitter 912, or various combinations thereof or various components thereof may be examples of means for performing various aspects of the present disclosure as described herein. For example, the group manager 904, the receiver 910, the transmitter 912, or various combinations or components thereof may support a method for performing one or more of the functions described herein.

In some implementations, the group manager 904, the receiver 910, the transmitter 912, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 906 and the memory 908 coupled with the processor 906 may be configured to perform one or more of the functions described herein (e.g., by executing, by the processor 906, instructions stored in the memory 908).

Additionally or alternatively, in some implementations, the group manager 904, the receiver 910, the transmitter 912, or various combinations or components thereof may be implemented in code (e.g., as communications management software or firmware) executed by the processor 906. If implemented in code executed by the processor 906, the functions of the group manager 904, the receiver 910, the transmitter 912, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the group manager 904 may be configured to perform various operations (e.g., receiving, monitoring, transmitting) using or otherwise in cooperation with the receiver 910, the transmitter 912, or both. For example, the group manager 904 may receive information from the receiver 910, send information to the transmitter 912, or be integrated in combination with the receiver 910, the transmitter 912, or both to receive information, transmit information, or perform various other operations as described herein. Although the group manager 904 is illustrated as a separate component, in some implementations, one or more functions described with reference to the group manager 904 may be supported by or performed by the processor 906, the memory 908, or any combination thereof. For example, the memory 908 may store code, which may include instructions executable by the processor 906 to cause the device 902 to perform various aspects of the present disclosure as described herein, or the processor 906 and the memory 908 may be otherwise configured to perform or support such operations.

For example, the group manager 904 may support wireless communication at a device (e.g., the device 902, a network entity) in accordance with examples as disclosed herein. The group manager 904 and/or other device components may be configured as or otherwise support an apparatus, such as a network entity, including a group manager to generate a group radio resource control release message with a group mobility configuration, the group radio resource control release message intended for communication to a group of multiple user equipments; and a transmitter to transmit the group radio resource control release message to the group of multiple user equipments, where a first user equipment is initiated to switch to a radio resource control inactive state if a radio resource control connection suspend configuration included in the group radio resource control release message is directed to the first user equipment, and where a second user equipment is initiated to switch to a radio resource control idle state if another radio resource control connection suspend configuration directed to the second user equipment is not included in the group radio resource control release message.

Additionally, the apparatus (e.g., a network entity) includes any one or combination of: the group radio resource control release message includes multiple radio resource control connection suspend configurations for a subset of user equipment in the group of multiple user equipments. The group radio resource control release message includes multiple redirected carrier information configurations.

The group manager 904 and/or other device components may be configured as or otherwise support a means for group-based connection release at a network entity, including generating a group radio resource control release message with a group mobility configuration, the group radio resource control release message intended for communication to a group of multiple user equipments; and transmitting the group radio resource control release message to the group of multiple user equipments, where a first user equipment is initiated to switch to an radio resource control inactive state if an radio resource control connection suspend configuration included in the group radio resource control release message is directed to the first user equipment, and where a second user equipment is initiated to switch to an radio resource control idle state if another radio resource control connection suspend configuration directed to the second user equipment is not included in the group radio resource control release message.

Additionally, group-based connection release at the user equipment includes any one or combination of: the group radio resource control release message may include multiple radio resource control connection suspend configurations for a subset of user equipment in the group of multiple user equipments. Alternatively or in addition, the group radio resource control release message may include multiple redirected carrier information configurations.

The processor 906 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 906 may be configured to operate a memory array using a memory controller. In some other implementations, a memory controller may be integrated into the processor 906. The processor 906 may be configured to execute computer-readable instructions stored in a memory (e.g., the memory 908) to cause the device 902 to perform various functions of the present disclosure.

The memory 908 may include random access memory (RAM) and read-only memory (ROM). The memory 908 may store computer-readable, computer-executable code including instructions that, when executed by the processor 906 cause the device 902 to perform various functions described herein. The code may be stored in a non-transitory computer-readable medium such as system memory or another type of memory. In some implementations, the code may not be directly executable by the processor 906 but may cause a computer (e.g., when compiled and executed) to perform functions described herein. In some implementations, the memory 908 may include, among other things, a basic I/O system (BIOS) which may control basic hardware or software operation such as the interaction with peripheral components or devices.

The I/O controller 914 may manage input and output signals for the device 902. The I/O controller 914 may also manage peripherals not integrated into the device 902. In some implementations, the I/O controller 914 may represent a physical connection or port to an external peripheral. In some implementations, the I/O controller 914 may utilize an operating system such as iOS®, ANDROID®, MS-DOS®, MS-WINDOWS®, OS/2®, UNIX®, LINUX®, or another known operating system. In some implementations, the I/O controller 914 may be implemented as part of a processor, such as the processor 906. In some implementations, a user may interact with the device 902 via the I/O controller 914 or via hardware components controlled by the I/O controller 914.

In some implementations, the device 902 may include a single antenna 916. However, in some other implementations, the device 902 may have more than one antenna 916, which may be capable of concurrently transmitting or receiving multiple wireless transmissions. The receiver 910 and the transmitter 912 may communicate bi-directionally, via the one or more antennas 916, wired, or wireless links as described herein. For example, the receiver 910 and the transmitter 912 may represent a wireless transceiver and may communicate bi-directionally with another wireless transceiver. The transceiver may also include a modem to modulate the packets, to provide the modulated packets to one or more antennas 916 for transmission, and to demodulate packets received from the one or more antennas 916.

Figure 10:
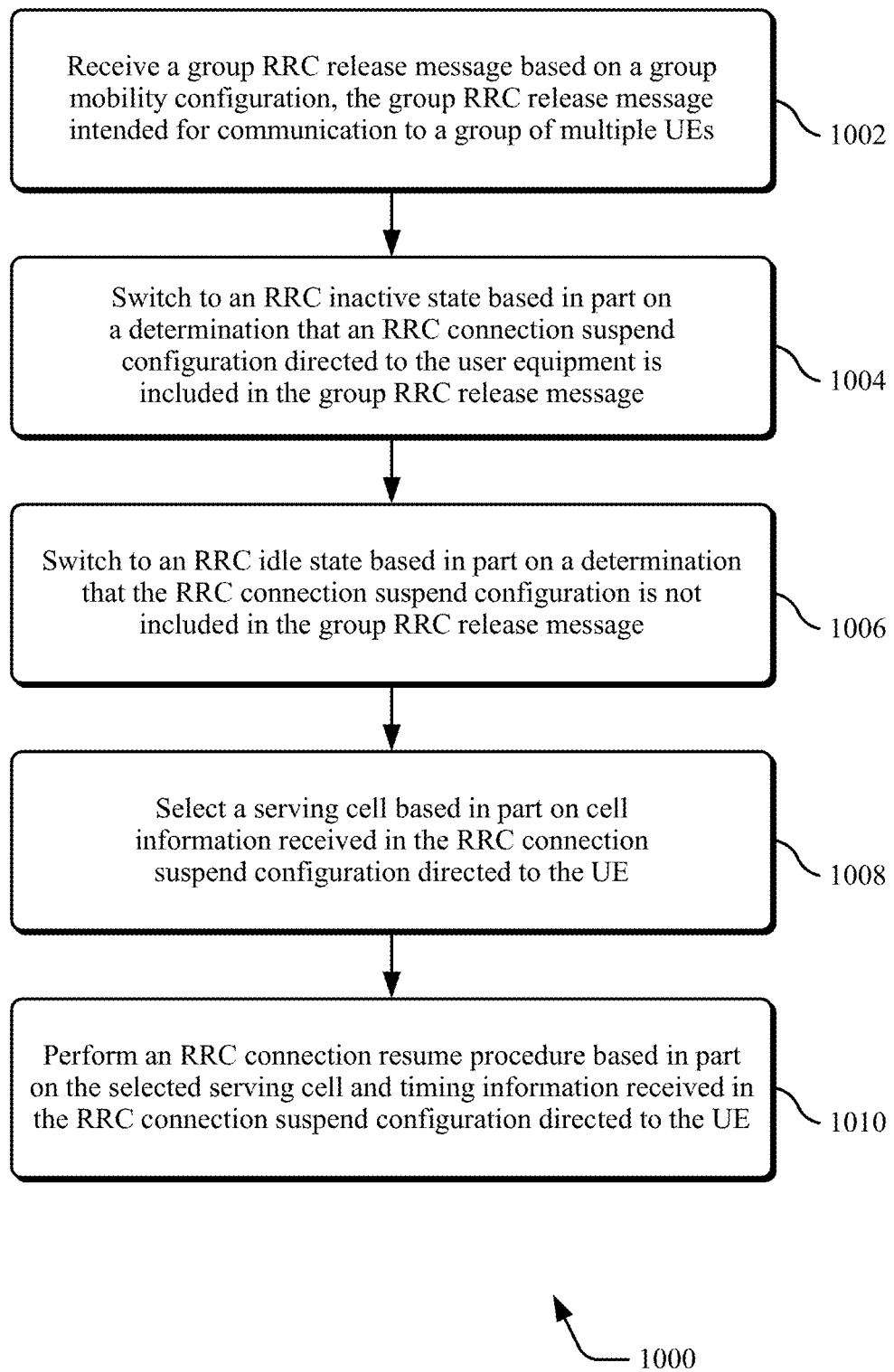
FIGS. 10 and 11 illustrate flowcharts of methods that support group-based connection release in accordance with aspects of the present disclosure.

FIG. 10 illustrates a flowchart of a method 1000 that supports group-based connection release in accordance with aspects of the present disclosure. The operations of the method 1000 may be implemented by a device or its components as described herein. For example, the operations of the method 1000 may be performed by a device, such as UE 104 as described with reference to FIGS. 1 through 9. In some implementations, the device may execute a set of instructions to control the function elements of the device to perform the described functions. Additionally, or alternatively, the device may perform aspects of the described functions using special-purpose hardware.

At 1002, the method may include receiving a group RRC release message based on a group mobility configuration, the group RRC release message intended for communication to a group of multiple UEs. In an implementation, the group mobility configuration includes a group identity and a UE identity of the UE within the group of multiple UEs, and the group of multiple UEs are configured with the group identity. The group RRC release message may include multiple RRC connection suspend configurations for a subset of UE from the group of multiple UEs, and the subset of UE are configured with a common configuration based on one of RAN notification area information, a RAN paging cycle, or a timer triggering a periodic RAN notification area update procedure. The operations of 1002 may be performed in accordance with examples as described herein. In some implementations, aspects of the operations of 1002 may be performed by a device as described with reference to FIG. 1.

At 1004, the method may include switching to an RRC inactive state based in part on a determination that an RRC connection suspend configuration directed to the user equipment is included in the group RRC release message. In an implementation, the UE identifies that the RRC connection suspend configuration includes an indication of the UE to determine that the RRC connection suspend configuration is directed to the UE. The operations of 1004 may be performed in accordance with examples as described herein. In some implementations, aspects of the operations of 1004 may be performed by a device as described with reference to FIG. 1.

At 1006, the method may include switching to an RRC idle state based in part on a determination that the RRC connection suspend configuration is not included in the group RRC release message. The operations of 1006 may be performed in accordance with examples as described herein. In some implementations, aspects of the operations of 1006 may be performed by a device as described with reference to FIG. 1.

At 1008, the method may include selecting a serving cell based in part on cell information received in the RRC connection suspend configuration directed to the UE. In an implementation, the group RRC release message includes multiple redirected carrier information configurations, and responsive to the determination that the RRC connection suspend configuration is not included in the group RRC release message, the operations may include identifying that at least one of the multiple redirected carrier information configurations is intended to the user equipment, and selecting a serving cell based on the at least one identified redirected carrier information configuration. The operations of 1008 may be performed in accordance with examples as described herein. In some implementations, aspects of the operations of 1008 may be performed by a device as described with reference to FIG. 1.

At 1010, the method may include performing an RRC connection resume procedure based in part on the selected serving cell and timing information received in the RRC connection suspend configuration directed to the UE. The operations of 1010 may be performed in accordance with examples as described herein. In some implementations, aspects of the operations of 1010 may be performed by a device as described with reference to FIG. 1.

Figure 11:
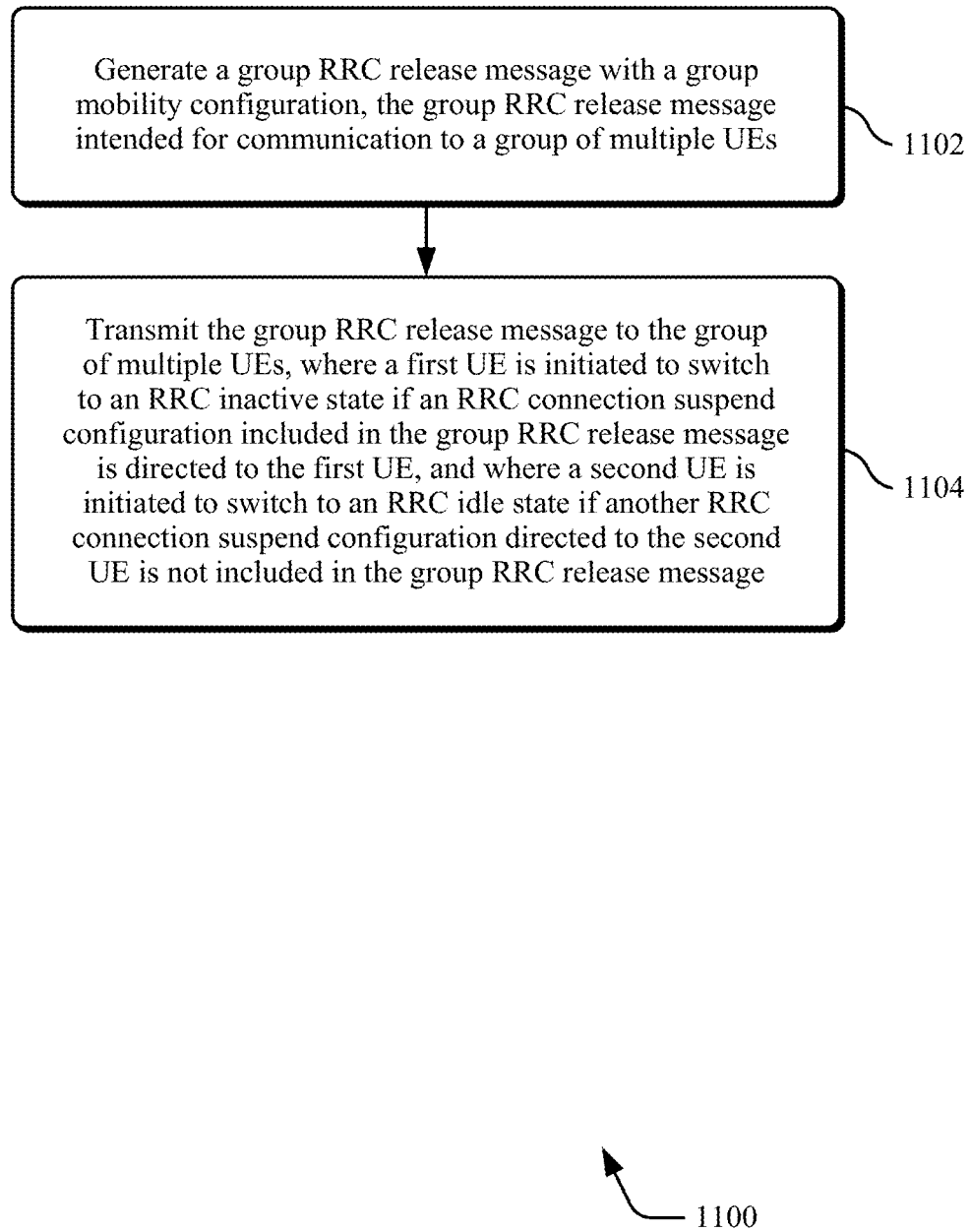

FIG. 11 illustrates a flowchart of a method 1100 that supports group-based connection release in accordance with aspects of the present disclosure. The operations of the method 1100 may be implemented by a device or its components as described herein. For example, the operations of the method 1100 may be performed by a network entity, such as a base station 102, a gNB, an NTN gateway, a logical function, or any other type of terrestrial or non-terrestrial network entity, as described with reference to FIGS. 1 through 9. In some implementations, the device may execute a set of instructions to control the function elements of the device to perform the described functions. Additionally, or alternatively, the device may perform aspects of the described functions using special-purpose hardware.

At 1102, the method may include generating a group RRC release message with a group mobility configuration, the group RRC release message intended for communication to a group of multiple UEs. In an implementation, the group RRC release message may include multiple RRC connection suspend configurations for a subset of UE in the group of multiple UEs. Alternatively or in addition, the group RRC release message may include multiple redirected carrier information configurations. The operations of 1102 may be performed in accordance with examples as described herein. In some implementations, aspects of the operations of 1102 may be performed by a device as described with reference to FIG. 1.

At 1104, the method may include transmitting the group RRC release message to the group of multiple UEs, where a first UE is initiated to switch to an RRC inactive state if an RRC connection suspend configuration included in the group RRC release message is directed to the first UE, and where a second UE is initiated to switch to an RRC idle state if another RRC connection suspend configuration directed to the second UE is not included in the group RRC release message. The operations of 1104 may be performed in accordance with examples as described herein. In some implementations, aspects of the operations of 1104 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   at least one memory; and
   at least one processor coupled with the at least one memory and configured to cause the UE to:
      receive, from a network equipment (NE), a group mobility configuration message that indicates a group identity associated with a group of multiple UEs;
      receive, from the NE and based at least in part on the group mobility configuration message, a group radio resource control release message intended for communication to the group of multiple UEs, wherein:
         the group radio resource control release message indicates for a first subset of UEs of the group of multiple UEs to switch to a radio resource control inactive state based at least in part on a first radio resource control connection suspend configuration included in the group radio resource control release message being directed to the first subset of UEs; and
         the group radio resource control release message indicates for a second subset of UEs in the group of multiple UEs to switch to a radio resource control idle state based at least in part on a second radio resource control connection suspend configuration directed to the second subset of UEs not being included in the group radio resource control release message; and
      switch to the radio resource control inactive state based at least in part on the first subset of UEs including the UE; or
      switch to the radio resource control idle state based at least in part on the second subset of UEs including the UE.

2. The UE of claim 1, wherein the group mobility configuration message comprises one or more of a UE identity of the UE within the group of multiple UEs or a group security key, and wherein the group of multiple UEs are configured with one or more of the group identity, the group security key, or respective UE identities.

3. The UE of claim 1, wherein the at least one processor is further configured to cause the UE to identify that at least one of the first radio resource control connection suspend configuration or the second radio resource control connection suspend configuration includes an indication of the UE.

4. The UE of claim 1, wherein at least one of the first subset of UEs or the second subset of UEs is configured with a common configuration based at least in part on one of radio access network notification area information, a radio access network paging cycle, or a timer triggering a periodic radio access network notification area update procedure.

5. The UE of claim 1, wherein the at least one processor is further configured to cause the UE to perform a radio resource control connection resume procedure based at least in part on timing information received in the group radio resource control release message.

6. The UE of claim 1, wherein the at least one processor is further configured to cause the UE to:
select a serving cell based at least in part on cell information received in the group radio resource control release message; and
perform a radio resource control connection resume procedure based at least in part on the serving cell.

7. The UE of claim 1, wherein the group radio resource control release message includes multiple redirected carrier information configurations.

8. The UE of claim 7, wherein, responsive to the group radio resource control release message failing to include multiple radio resource control connection suspend configurations, the at least one processor is configured to cause the UE to:
identify that at least one redirected carrier information configuration of the multiple redirected carrier information configurations is intended for the UE; and
select a serving cell based at least in part on the at least one redirected carrier information configuration.

9. The UE of claim 8, wherein the at least one processor is further configured to cause the UE to identify that the at least one redirected carrier information configuration is intended for the UE based at least in part on the at least one redirected carrier information configuration including one or more indications of one or more UEs including an indication of the UE.

10. The UE of claim 1, wherein the group radio resource control release message includes multiple radio resource control connection suspend configurations for a third subset of UEs of the group of multiple UEs.

11. A network equipment (NE) for wireless communication, comprising:
at least one memory; and
at least one processor coupled with the at least one memory and configured to cause the NE to:
transmit a group mobility configuration message that indicates a group identity associated with a group of multiple user equipment (UEs); and
transmit, based at least in part on the group mobility configuration message, a group radio resource control release message to the group of multiple UEs, wherein:
the group radio resource control release message indicates for a first UE in the group of multiple UEs to switch to a radio resource control inactive state based at least in part on a first radio resource control connection suspend configuration included in the group radio resource control release message being directed to the first UE; and
the group radio resource control release message indicates for a second UE in the group of multiple UEs to switch to a radio resource control idle state based at least in part on a second radio resource control connection suspend configuration directed to the second UE not being included in the group radio resource control release message.

12. The NE of claim 11, wherein the group radio resource control release message includes multiple radio resource control connection suspend configurations for a subset of UEs in the group of multiple UEs.

13. The NE of claim 11, wherein the group radio resource control release message includes multiple redirected carrier information configurations.

14. A method performed by a user equipment (UE), the method comprising:
receiving, from a network equipment (NE), a group mobility configuration message that indicates a group identity associated with a group of multiple UEs;
receiving, from the NE and based at least in part on the group mobility configuration message, a group radio resource control release message intended for communication to the group of multiple UEs, wherein:
the group radio resource control release message indicates for a first subset of UEs of the group of multiple UEs to switch to a radio resource control inactive state based at least in part on a first radio resource control connection suspend configuration included in the group radio resource control release message being directed to the first subset of UEs; and
the group radio resource control release message indicates for a second subset of UEs in the group of multiple UEs to switch to a radio resource control idle state based at least in part on a second radio resource control connection suspend configuration directed to the second subset of UEs not being included in the group radio resource control release message; and
switching to the radio resource control inactive state based at least in part on the first subset of UEs including the UE; or
switching to the radio resource control idle state based at least in part on the second subset of UEs including the UE.

15. The method of claim 14, wherein the group mobility configuration message comprises one or more of a UE identity of the UE within the group of multiple UEs or a group security key, and wherein the group of multiple UEs are configured with one or more of the group identity, the group security key, or respective UE identities.

16. The method of claim 14, further comprising identifying that at least one of the first radio resource control connection suspend configuration or the second radio resource control connection suspend configuration includes an indication of the UE.

17. The method of claim 14, wherein at least one of the first subset of UEs or the second subset of UEs is configured with a common configuration based at least in part on one of radio access network notification area information, a radio access network paging cycle, or a timer triggering a periodic radio access network notification area update procedure.

18. The method of claim 14, further comprising performing a radio resource control connection resume procedure based at least in part on timing information received in the group radio resource control release message.

19. The method of claim 14, further comprising:
selecting a serving cell based at least in part on cell information received in the group radio resource control release message; and
performing a radio resource control connection resume procedure based at least in part on the serving cell.

20. A method performed by a network equipment (NE), the method comprising:
transmitting a group mobility configuration message that indicates a group identity associated with a group of multiple user equipment (UEs); and transmitting, based at least in part on the group mobility configuration message, a group radio resource control release message to the group of multiple UEs, wherein:
- the group radio resource control release message indicates for a first UE in the group of multiple UEs to switch to a radio resource control inactive state based at least in part on a first radio resource control connection suspend configuration included in the group radio resource control release message being directed to the first UE; and
- the group radio resource control release message indicates for a second UE in the group of multiple UEs to switch to a radio resource control idle state based at least in part on a second radio resource control connection suspend configuration directed to the second UE not being included in the group radio resource control release message.

* * * * *